US012634698B2

(12) United States Patent
Patil et al.

(10) Patent No.: US 12,634,698 B2
(45) Date of Patent: May 19, 2026

(54) PROTECTING TIMING SYNCHRONIZATION FUNCTION VALUES WITH SECURITY PARAMETERS

(71) Applicant: QUALCOMM Incorporated, San Diego, CA (US)

(72) Inventors: Abhishek Pramod Patil, San Diego, CA (US); Sai Yiu Duncan Ho, San Diego, CA (US); George Cherian, San Diego, CA (US); Alfred Asterjadhi, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/420,551

(22) Filed: Jan. 23, 2024

(65) Prior Publication Data

US 2025/0240624 A1    Jul. 24, 2025

(51) Int. Cl.
*H04W 12/106* (2021.01)
*H04W 12/06* (2021.01)
*H04W 12/61* (2021.01)
*H04W 84/12* (2009.01)

(52) U.S. Cl.
CPC ......... *H04W 12/106* (2021.01); *H04W 12/06* (2013.01); *H04W 12/61* (2021.01); *H04W 84/12* (2013.01)

(58) Field of Classification Search
None
See application file for complete search history.

(56) References Cited

U.S. PATENT DOCUMENTS

| | | | | | |
|---|---|---|---|---|---|
| 2020/0169916 | A1* | 5/2020 | Gholmieh | ........... | H04W 12/106 |
| 2020/0359259 | A1* | 11/2020 | Patil | ...................... | H04W 88/08 |
| 2021/0135792 | A1* | 5/2021 | Cho | ...................... | H04L 1/1887 |

(Continued)

FOREIGN PATENT DOCUMENTS

WO    WO-2019227869 A1    12/2019

OTHER PUBLICATIONS

Chu L (NXP)., et al., "Beacon Design", IEEE 802.11-23/0284r0, 11-23-0284-00-0UHR-Beacon-Design, IEEE-Sa Mentor, Piscataway, NJ USA, vol. 802.11 UHR, Jun. 1, 2023, pp. 1-12, Feb. 10, 2023, XP068203566, Slide 12.

(Continued)

*Primary Examiner* — William J. Goodchild
(74) *Attorney, Agent, or Firm* — Holland & Hart LLP

(57) ABSTRACT

This disclosure provides methods, components, devices and systems for protecting timing synchronization function (TSF) values with message integrity checks (MICs). Various aspects relate generally to methods for a wireless device to protect the TSF field using an MIC. Some aspects more specifically relate to methods for the wireless device to include a MIC value generated using a TSF field of a beacon frame in a beacon extension frame. Some aspects more specifically relate to methods for the wireless device to include the MIC value generated using the TSF field in an information element (IE) of a beacon frame. In some examples, a vendor-specific (VS) IE or another IE. In some examples, the associated TSF field may be a TSF field of the beacon frame or of a recurring time epoch, such as a target beacon transmission time (TBTT) of the beacon frame.

16 Claims, 16 Drawing Sheets

Beacon Frame 502

Beacon Extension Frame 526

500-a 500-b

(56) References Cited

U.S. PATENT DOCUMENTS

| | | | | |
|---|---|---|---|---|
| 2022/0116797 A1* | 4/2022 | Huang | ................. | H04L 5/0053 |
| 2022/0167256 A1* | 5/2022 | Kneckt | .............. | H04W 12/037 |
| 2023/0089319 A1* | 3/2023 | Kneckt | ................ | H04W 12/50 |
| | | | | 370/328 |
| 2023/0144897 A1 | 5/2023 | Kneckt et al. | | |

OTHER PUBLICATIONS

International Search Report and Written Opinion—PCT/US2024/057837—ISA/EPO—Mar. 18, 2025.

* cited by examiner

Beacon Frame 502

500-a

Beacon Extension Frame 526

500-b

Periodicity 608-b

Periodicity 608-a 606-a    606-b    606-c    606-d    606-e 602-a    604-a    602-b    602-c    604-b Beacon Frame 602

Beacon Extension Frame 604

Security Parameter 606

600

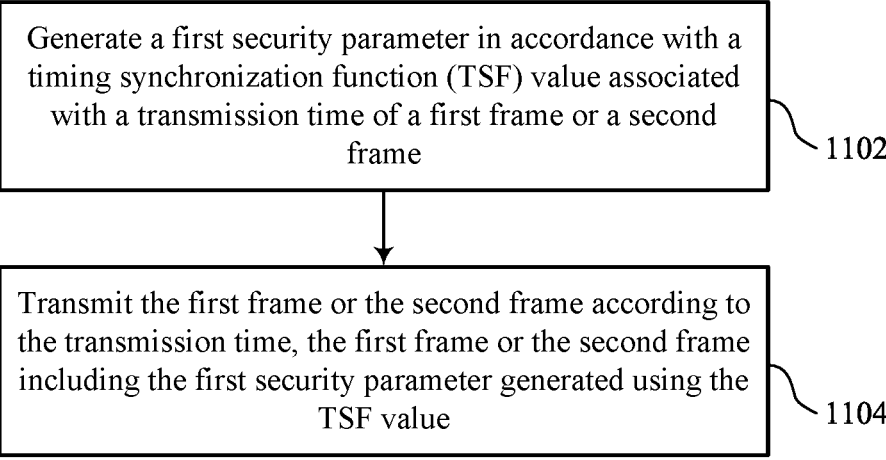

Generate a first security parameter in accordance with a timing synchronization function (TSF) value associated with a transmission time of a first frame or a second frame    ⎰ 1102

Transmit the first frame or the second frame according to the transmission time, the first frame or the second frame including the first security parameter generated using the TSF value    ⎰ 1104

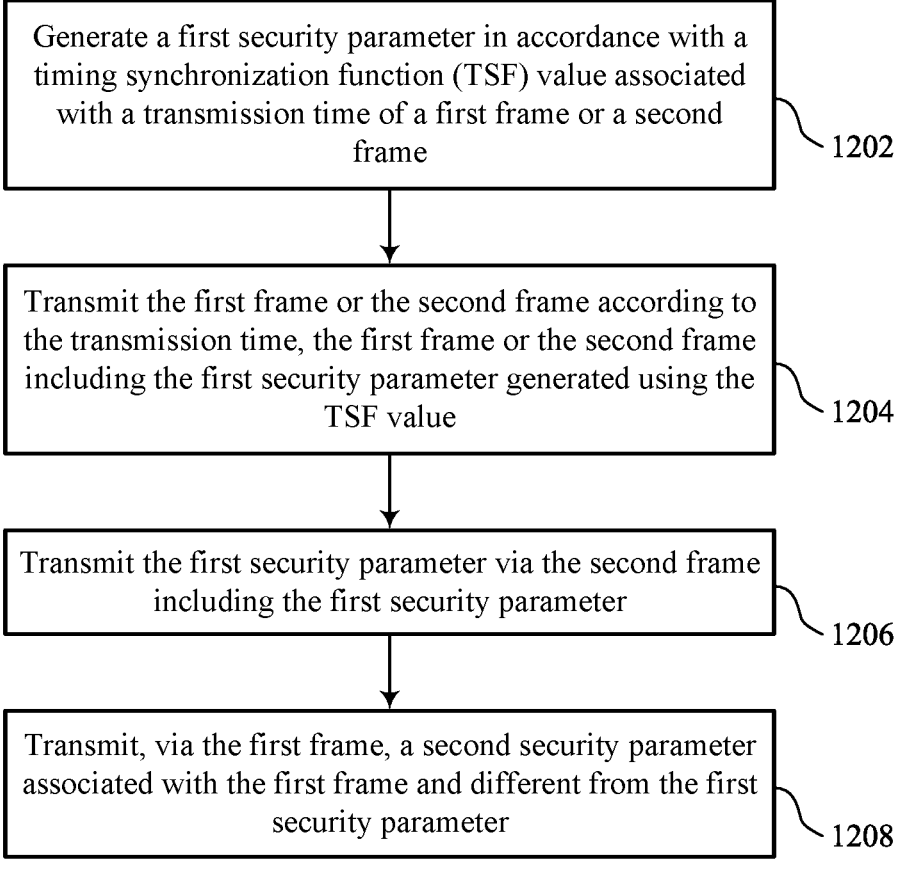

Generate a first security parameter in accordance with a timing synchronization function (TSF) value associated with a transmission time of a first frame or a second frame ⟍ 1202

Transmit the first frame or the second frame according to the transmission time, the first frame or the second frame including the first security parameter generated using the TSF value ⟍ 1204

Transmit the first security parameter via the second frame including the first security parameter ⟍ 1206

Transmit, via the first frame, a second security parameter associated with the first frame and different from the first security parameter ⟍ 1208

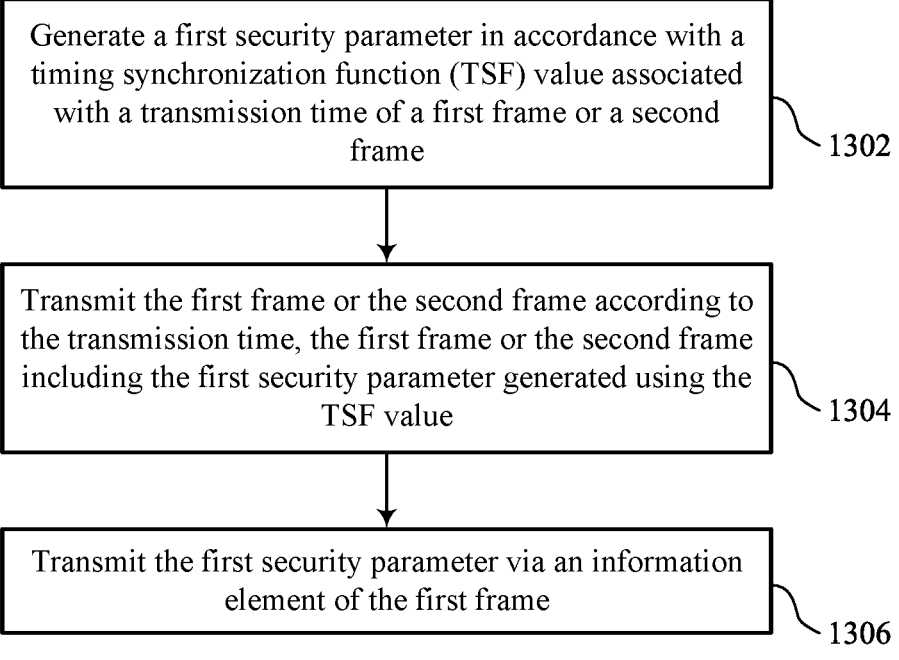

Generate a first security parameter in accordance with a timing synchronization function (TSF) value associated with a transmission time of a first frame or a second frame

1302

Transmit the first frame or the second frame according to the transmission time, the first frame or the second frame including the first security parameter generated using the TSF value

1304

Transmit the first security parameter via an information element of the first frame

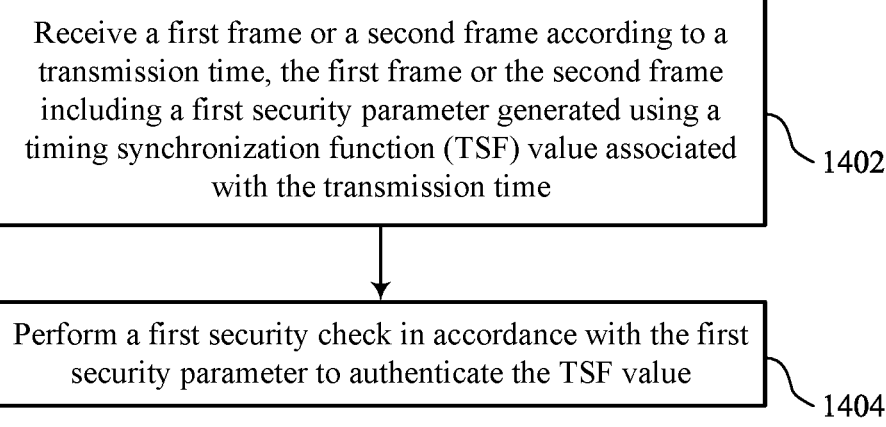

Receive a first frame or a second frame according to a transmission time, the first frame or the second frame including a first security parameter generated using a timing synchronization function (TSF) value associated with the transmission time ⟩ 1402

Perform a first security check in accordance with the first security parameter to authenticate the TSF value ⟩ 1404

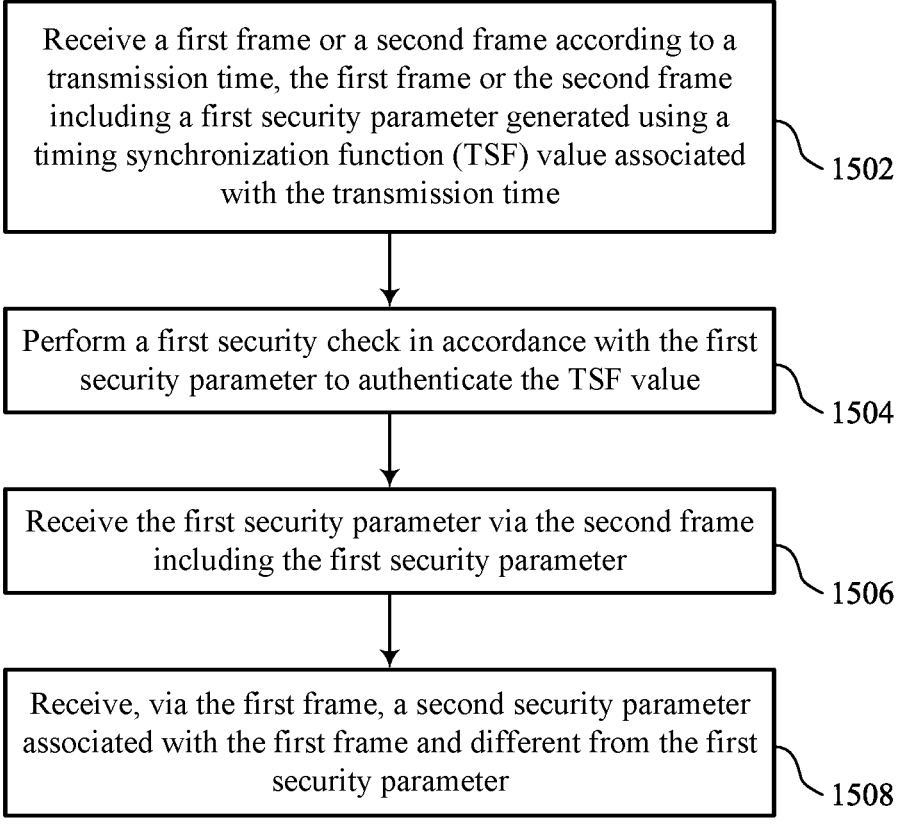

Receive a first frame or a second frame according to a transmission time, the first frame or the second frame including a first security parameter generated using a timing synchronization function (TSF) value associated with the transmission time          1502

Perform a first security check in accordance with the first security parameter to authenticate the TSF value          1504

Receive the first security parameter via the second frame including the first security parameter          1506

Receive, via the first frame, a second security parameter associated with the first frame and different from the first security parameter          1508

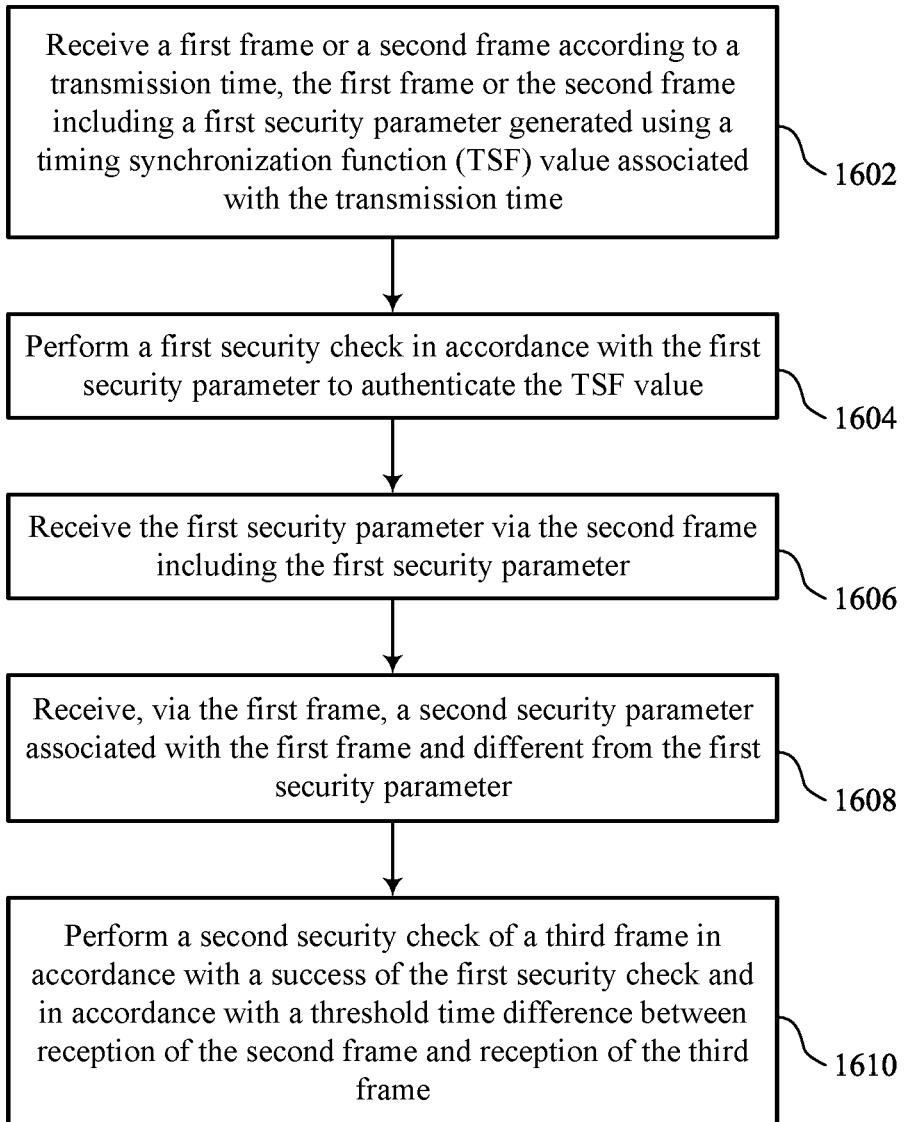

Receive a first frame or a second frame according to a transmission time, the first frame or the second frame including a first security parameter generated using a timing synchronization function (TSF) value associated with the transmission time
1602

Perform a first security check in accordance with the first security parameter to authenticate the TSF value
1604

Receive the first security parameter via the second frame including the first security parameter
1606

Receive, via the first frame, a second security parameter associated with the first frame and different from the first security parameter
1608

Perform a second security check of a third frame in accordance with a success of the first security check and in accordance with a threshold time difference between reception of the second frame and reception of the third frame
1610

PROTECTING TIMING SYNCHRONIZATION FUNCTION VALUES WITH SECURITY PARAMETERS

TECHNICAL FIELD

This disclosure relates generally to wireless communication and, more specifically, to protecting timing synchronization function (TSF) values with message integrity checks (MICs).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a data frame (such as a beacon frame) sent over-the-air between a STA or AP wirelessly communicating with another STA or AP may include information, such as a beacon interval, capability information, and one or more information elements (IEs). Some fields may be protected by security parameter, such as a message integrity check (MIC) value generated using the information carried via these fields. However, some fields (such as timing synchronization function (TSF) field) may not be protected by the MIC.

SUMMARY

The systems, methods, and devices of this disclosure each have several innovative aspects, no single one of which is solely responsible for the desirable attributes disclosed herein. The described techniques relate generally to methods for a wireless device to protect a timing synchronization (TSF) field using a security parameter such as a message integrity check (MIC). Some aspects more specifically relate to methods for the wireless device to include a MIC value generated using a TSF field of a beacon frame in a beacon extension frame. Some aspects more specifically relate to methods for the wireless device to include the MIC value generated using the TSF field in an information element (IE) of a beacon frame. In some examples, a vendor-specific (VS) IE or another IE. In some examples, the associated TSF field may be a TSF field of the beacon frame or of a recurring time epoch, such as a target beacon transmission time (TBTT) of the beacon frame.

A method for wireless communications by a wireless device is described. The method may include generating a first security parameter in accordance with a TSF value associated with a transmission time of a first frame or a second frame and transmitting the first frame or the second frame according to the transmission time, the first frame or the second frame including the first security parameter generated using the TSF value.

In some embodiments, a wireless device for wireless communications may include a processing system that includes processor circuitry and memory circuitry that stores code. The processing system may be configured to cause the wireless device to generate a first security parameter in accordance with a TSF value associated with a transmission time of a first frame or a second frame and transmit the first frame or the second frame according to the transmission time, the first frame or the second frame including the first security parameter generated using the TSF value.

In some embodiments, a wireless device for wireless communications may include means for generating a first security parameter in accordance with a TSF value associated with a transmission time of a first frame or a second frame and means for transmitting the first frame or the second frame according to the transmission time, the first frame or the second frame including the first security parameter generated using the TSF value.

In some embodiments, a non-transitory computer-readable medium storing code for wireless communications may include instructions executable by one or more processors to generate a first security parameter in accordance with a TSF value associated with a transmission time of a first frame or a second frame and transmit the first frame or the second frame according to the transmission time, the first frame or the second frame including the first security parameter generated using the TSF value.

In some examples of the method, wireless devices, and non-transitory computer-readable medium described herein, transmitting the first frame or the second frame according to the transmission time may include operations, features, means, or instructions for transmitting the first security parameter via the second frame including the first security parameter and transmitting, via the first frame, a second security parameter associated with the first frame and different from the first security parameter.

In some examples of the method, wireless devices, and non-transitory computer-readable medium described herein, the first frame may be a beacon frame and the second frame may be a beacon extension frame and a first periodicity of the first frame may be different from a second periodicity of the second frame.

In some examples of the method, wireless devices, and non-transitory computer-readable medium described herein, transmitting the first frame or the second frame according to the transmission time may include operations, features, means, or instructions for transmitting the first security parameter via an IE of the first frame.

In some examples of the method, wireless devices, and non-transitory computer-readable medium described herein, the IE may be a VS IE.

In some examples of the method, wireless devices, and non-transitory computer-readable medium described herein, the IE may be a last VS IE prior to a management MIC element (MME) of the first frame and the MME of the first frame contains the second security parameter.

In some examples of the method, wireless devices, and non-transitory computer-readable medium described herein, the TSF value indicates a TBTT associated with the first frame and the transmission time may be offset from the TBTT.

In some examples of the method, wireless devices, and non-transitory computer-readable medium described herein, transmitting the first frame or the second frame according to the transmission time may include operations, features, means, or instructions for transmitting the first security parameter via an IE of the first frame or of the second frame, where the TSF value indicates an actual transmission time of the first frame or of the second frame, and where the security parameter may be included in a corresponding one of the first frame or the second frame.

Some examples of the method, wireless devices, and non-transitory computer-readable medium described herein may further include operations, features, means, or instructions for transmitting an indication of a security scheme associated with the first security parameter, where transmitting the first frame or the second frame including the first security parameter may be in accordance with the security scheme.

In some examples of the method, wireless devices, and non-transitory computer-readable medium described herein, the first security parameter includes a MIC parameter, an encryption parameter, a key identifier (ID), a packet number (PN), or a MME.

A method for wireless communications by a wireless device is described. The method may include receiving a first frame or a second frame according to a transmission time, the first frame or the second frame including a first security parameter generated using a TSF value associated with the transmission time and performing a first security check in accordance with the first security parameter to authenticate the TSF value.

In some embodiments, a wireless device for wireless communications may include a processing system that includes processor circuitry and memory circuitry that stores code. The processing system may be configured to cause the wireless device to receive a first frame or a second frame according to a transmission time, the first frame or the second frame including a first security parameter generated using a TSF value associated with the transmission time and perform a first security check in accordance with the first security parameter to authenticate the TSF value.

In some embodiments, a wireless device for wireless communications may include means for receiving a first frame or a second frame according to a transmission time, the first frame or the second frame including a first security parameter generated using a TSF value associated with the transmission time and means for performing a first security check in accordance with the first security parameter to authenticate the TSF value.

In some embodiments, a non-transitory computer-readable medium storing code for wireless communications may include instructions executable by one or more processors to receive a first frame or a second frame according to a transmission time, the first frame or the second frame including a first security parameter generated using a TSF value associated with the transmission time and perform a first security check in accordance with the first security parameter to authenticate the TSF value.

In some examples of the method, wireless devices, and non-transitory computer-readable medium described herein, receiving the first frame or the second frame according to the transmission time may include operations, features, means, or instructions for receiving the first security parameter via the second frame including the first security parameter and receiving, via the first frame, a second security parameter associated with the first frame and different from the first security parameter.

Some examples of the method, wireless devices, and non-transitory computer-readable medium described herein may further include operations, features, means, or instructions for performing a second security check of a third frame in accordance with a success of the first security check and in accordance with a threshold time difference between reception of the second frame and reception of the third frame.

In some examples of the method, wireless devices, and non-transitory computer-readable medium described herein, a first periodicity of the first frame may be different from a second periodicity of the second frame.

In some examples of the method, wireless devices, and non-transitory computer-readable medium described herein, receiving the first frame or the second frame according to the transmission time may include operations, features, means, or instructions for receiving the first security parameter via an IE of the first frame.

In some examples of the method, wireless devices, and non-transitory computer-readable medium described herein, the IE may be a VS IE.

In some examples of the method, wireless devices, and non-transitory computer-readable medium described herein, the IE may be a last VS IE prior to a MME of the first frame and the MME of the first frame contains the second security parameter.

In some examples of the method, wireless devices, and non-transitory computer-readable medium described herein, the TSF value indicates a TBTT associated with the first frame and the transmission time may be offset from the TBTT.

In some examples of the method, wireless devices, and non-transitory computer-readable medium described herein, receiving the first frame or the second frame according to the transmission time may include operations, features, means, or instructions for receiving the first security parameter via an IE of the first frame or of the second frame, where the TSF value indicates an actual transmission time of the first frame or of the second frame, and where the security parameter may be included in a corresponding one of the first frame or the second frame.

Some examples of the method, wireless devices, and non-transitory computer-readable medium described herein may further include operations, features, means, or instructions for receiving an indication of a security scheme associated with the first security parameter, where receiving the first frame or the second frame including the first security parameter may be in accordance with the security scheme.

In some examples of the method, wireless devices, and non-transitory computer-readable medium described herein, the first security parameter includes a MIC parameter, an encryption parameter, a key ID, a PN, or a MME.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 11 through 16 show flowcharts illustrating example processes performable by or at a wireless device that supports protecting TSF values with security parameters.

Like reference numbers and designations in the various drawings indicate like elements.

DETAILED DESCRIPTION

Figure 1:
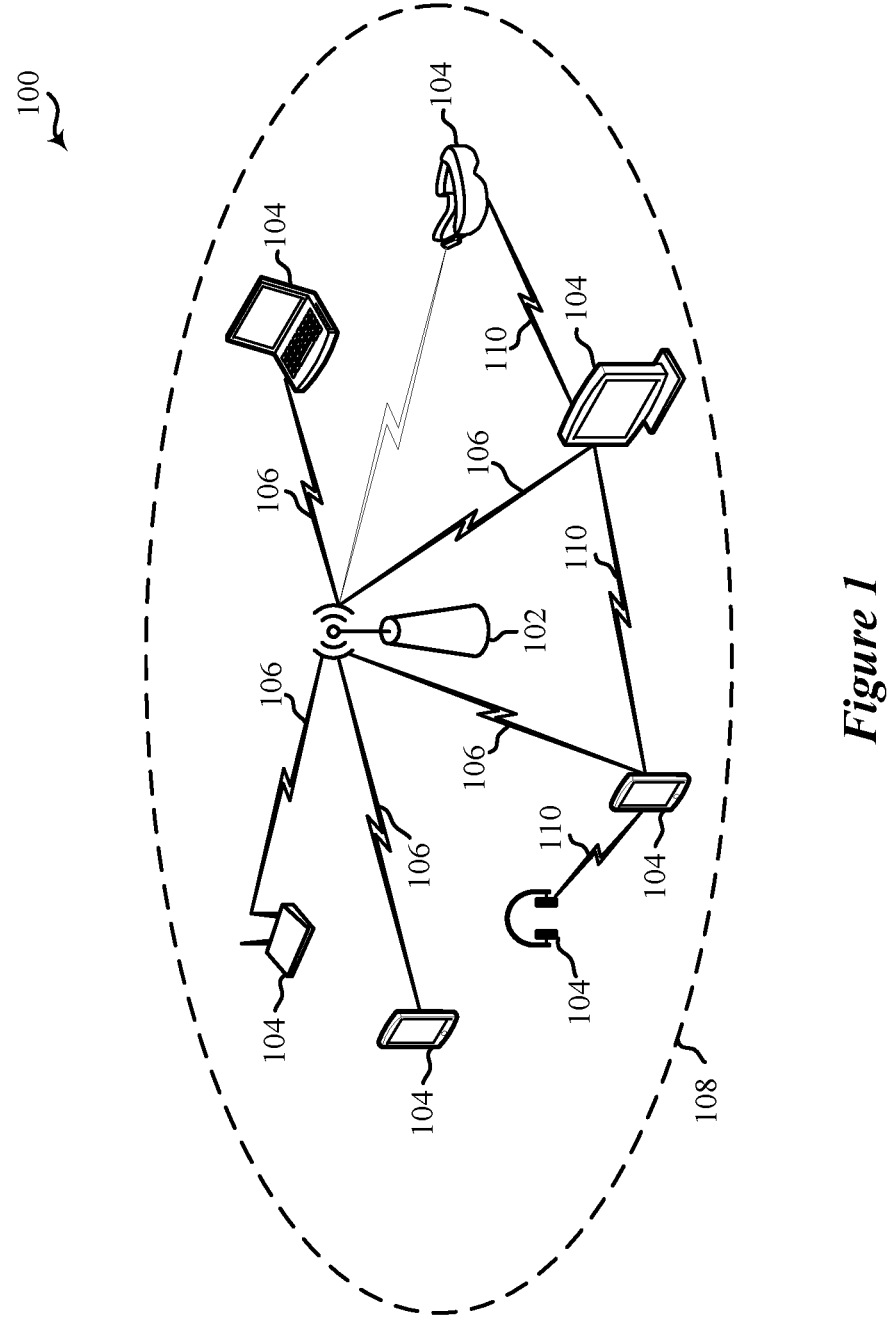
FIG. 1 shows a pictorial diagram of an example wireless communication network that supports protecting timing synchronization function (TSF) values with security parameters.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IoT) network.

A WLAN may include one or more access points (APs) and non AP stations (STAs) that communicate with each other via specific communication links (such as channels within a given frequency band). In some WLANs that support multi link operations (MLO), a non-AP STA may affiliate with a non-AP multi-link device (MLD) that operates on multiple communication links. Likewise, an AP may affiliate with (such as by being controlled or managed by) one or more AP MLDs that operate on more than one communication link. As used herein, the term "STA" may refer to any type of wireless STA, such as a non-AP STA, a non-MLD STA, a non MLD non-AP STA, or the like. Similarly, the term "AP" may refer to any type of wireless AP, such as an AP MLD or a non-MLD AP, among other examples.

Security in WLAN communications may be provided through mechanisms that protect certain control frames and fields within a medium access control (MAC) header, such as encryption, integrity checks, or both. For example, a wireless device (such as a STA) may generate a frame (such as a beacon frame) with a management message integrity check (MIC) element (MME) information element (IE). The MME may include a MIC value which may be used by a receiving wireless device to verify an integrity of one or more fields of the beacon frame. In some examples, the beacon frame also may include a timing synchronization function (TSF) field that may indicate a time at which the frame was transmitted by the wireless device. In some examples, the TSF field may not be protected by the MIC value. That is, a device may receive the frame and interpret the TSF field without considering the MIC value. However, some operations and features (such as packet number (PN) generation, restricted target wake time (r-TWT)) may rely on or otherwise use a value of the TSF field. Such operations and features may therefore be less secure than operations using information protected by the MIC.

Various aspects relate generally to methods for a wireless device (such as an AP) to protect the TSF field using a MIC or another parameter, such as an encryption parameter. Some aspects more specifically relate to methods for the wireless device to include a MIC value generated using a TSF field of a beacon frame in a beacon extension frame (such as a frame for offloading information associated with the beacon frame). In some examples, the beacon extension frame may have a different periodicity than the beacon frame. In some examples, the MIC value generated using the TSF field may be different from a MIC value generated using one or more other fields of the beacon frame.

Some aspects more specifically relate to methods for the wireless device to include the MIC value generated using the TSF field in an IE of a beacon frame. In some examples, the IE may be an existing IE (such as a reused IE) or a vendor-specific (VS) IE. In some examples, the associated TSF field may be a TSF field of the beacon frame. In some examples, the associated TSF field may be a TSF field of a recurring time epoch, such as a target beacon transmission time (TBTT) of the beacon frame.

Particular aspects of the subject matter described in this disclosure can be implemented to realize one or more of the following potential advantages. In some examples, by including the MIC generated using the TSF value in an IE or a beacon extension frame, the described techniques can be used to increase reliability of a wireless communications system via increased security. In some examples, by introducing a TSF-based MIC different from the MIC generated using one or more other fields of the beacon frame, the TSF-based MIC may not be detected by one or more other STAs (such as STAs for which the beacon frame is not intended), which may further increase reliability. In some examples, by including an MIC generated using a TSF value of one or more recurring time epochs, the AP may reduce processing and latency by generating the MIC prior to transmission of the beacon frame.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11 bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a TSF for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Figure 2:
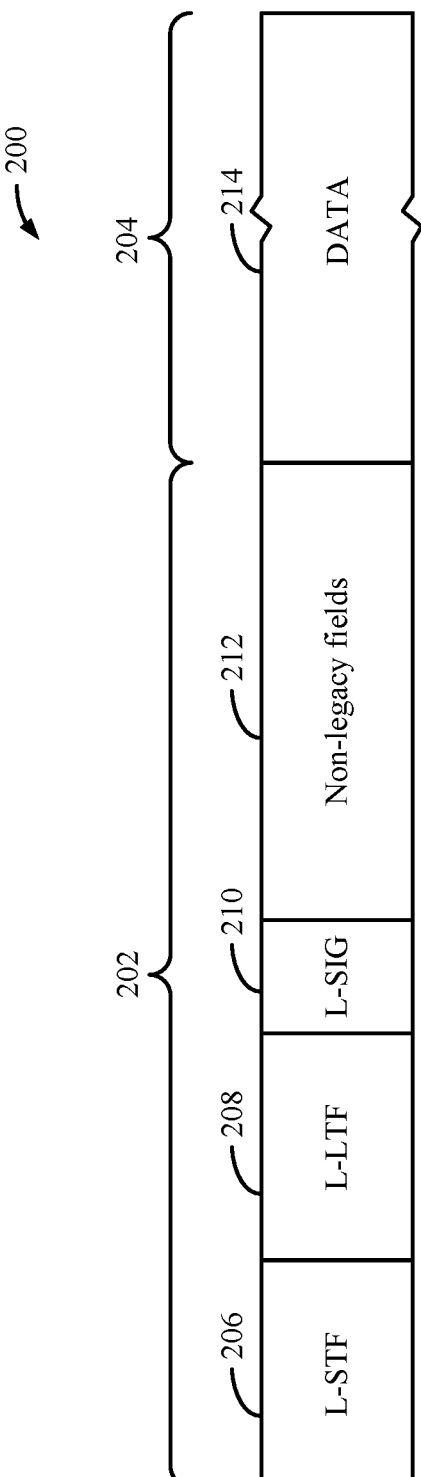
FIG. 2 shows an example protocol data unit (PDU) usable for communications between a wireless access point (AP) and one or more wireless stations (STAs) that supports protecting timing TSF values with security parameters.

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (such as obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
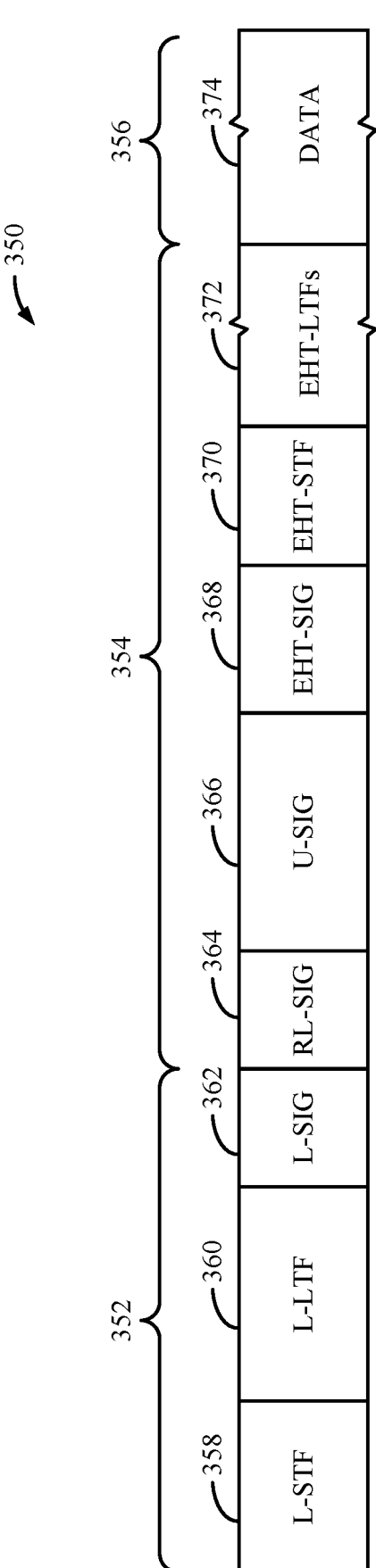
FIG. 3 shows an example physical layer (PHY) protocol data unit (PPDU) usable for communications between a wireless AP and one or more wireless STAs that supports methods for protecting timing TSF values with security parameters.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as an AP 102 or a STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (such as STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
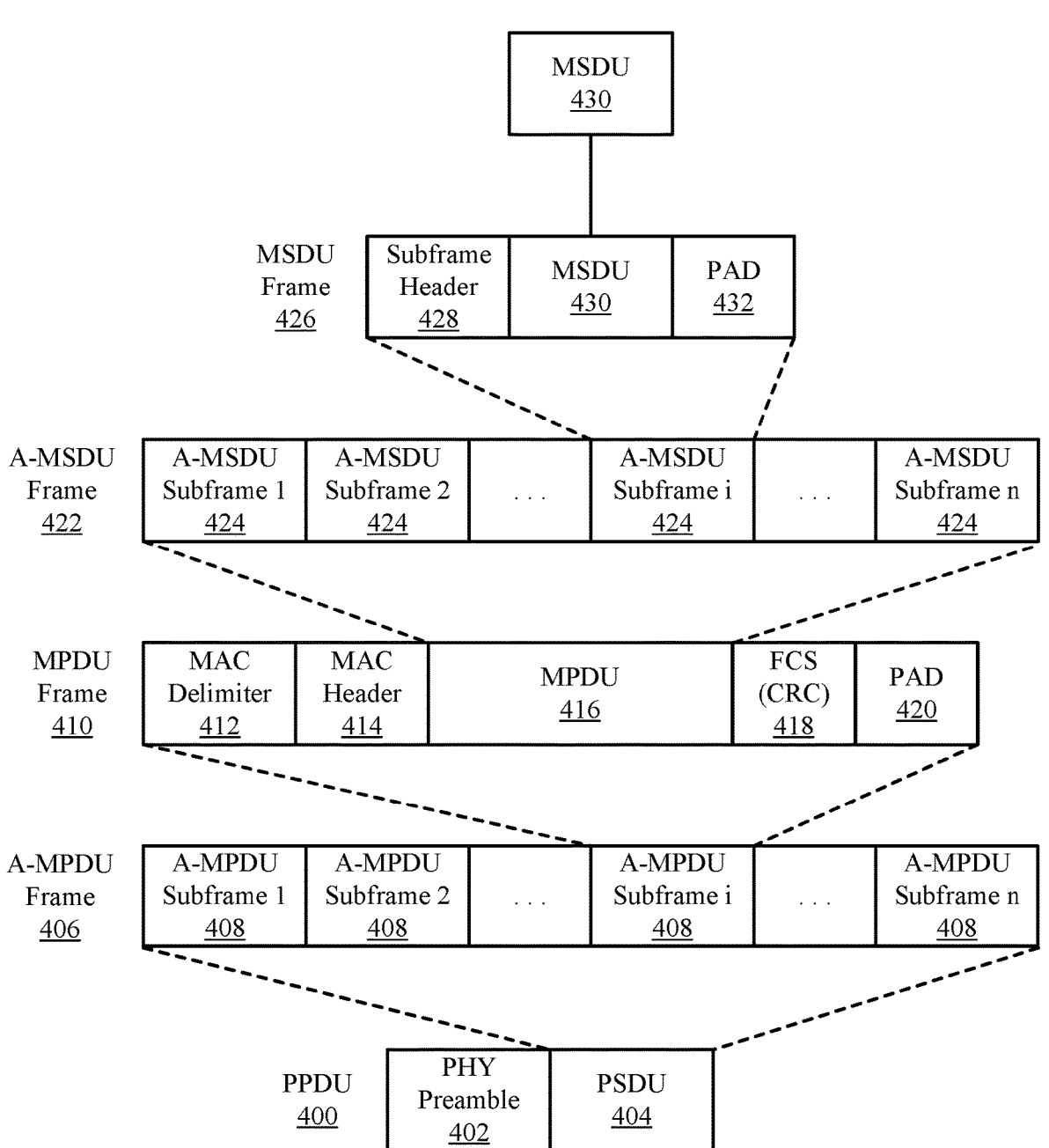
FIG. 4 shows a hierarchical format of an example PPDU usable for communications between a wireless AP and one or more wireless STAs that supports methods for protecting timing TSF values with security parameters.

FIG. 4 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 408 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (such as the FCS field 418 may include a cyclic redundancy check (CRC)) and padding bits 420. The MPDU 416 may carry one or more MAC service data units (MSDUs) 430. For example, the MPDU 416 may carry an aggregated MSDU (A-MSDU) 422 including multiple A-MSDU subframes 424. Each A-MSDU subframe 424 may be associated with an MSDU frame 426 and may contain a corresponding MSDU 430 preceded by a subframe header 428 and, in some examples, followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body. The MAC header 414 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes one or more fields indicating addresses for the data encapsulated within the frame body. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a MIC for one or more relevant fields).

In some environments, locations, or conditions, a regulatory body may impose a power spectral density (PSD) limit for one or more communication channels or for an entire band (such as the 6 GHz band). A PSD is a measure of transmit power as a function of a unit bandwidth (such as per 1 MHz). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of a wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (such as duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous transmission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communications because benefits to addressing PSD limits may only be present for uplink communications.

Some aspects of the wireless communications network 100, the PDU 200, and the PPDUs of FIGS. 3 and 4 may allow for a wireless device (such as an AP 102) to protect aspects of a MAC header 414 (such as a TSF field) using a MIC or another parameter, such as an encryption parameter. Some aspects more specifically relate to methods for the wireless device to include a MIC value generated using a TSF field of a beacon frame in a beacon extension frame (such as a frame for offloading information associated with the beacon frame) transmitted to another wireless device (such as an STA 104). In some examples, the beacon extension frame may have a different periodicity than the beacon frame. In some examples, the MIC value generated using the TSF field may be different from a MIC value generated using one or more other fields of the beacon frame.

Some aspects more specifically relate to methods for the wireless device to include the MIC value generated using the TSF field in an IE of a beacon frame. In some examples, the IE may be an existing IE (such as a reused IE) or a VS IE. In some examples, the associated TSF field may be a TSF field of the beacon frame. In some examples, the associated TSF field may be a TSF field of a recurring time epoch, such as a TBTT of the beacon frame.

Figure 5A:
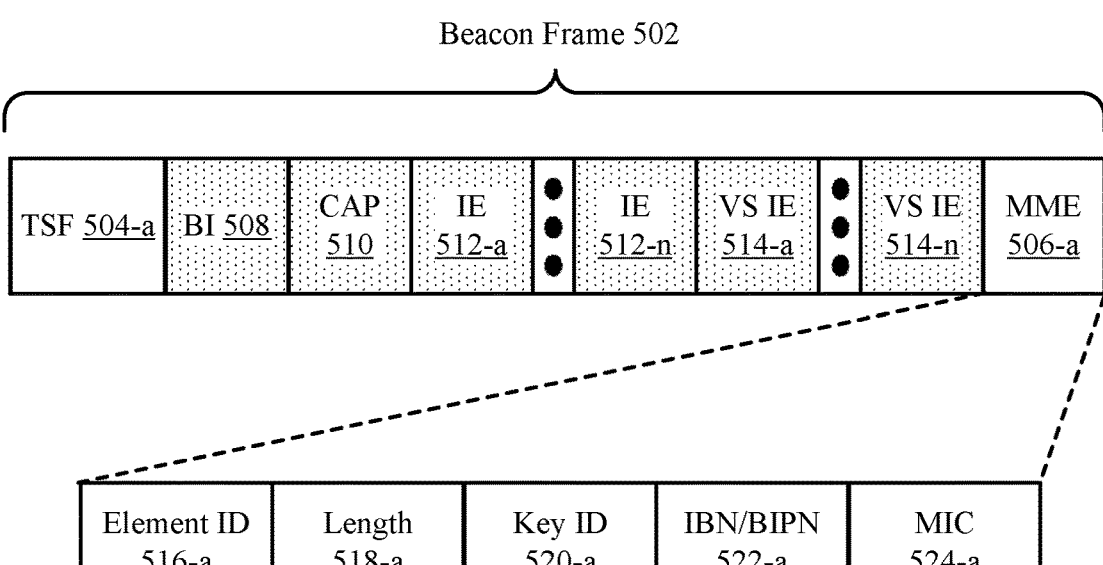
FIG. 5A and FIG. 5B show examples of frame structures usable for communications between a wireless AP and one or more wireless STAs that support protecting timing TSF values with security parameters.
Figure 5B:
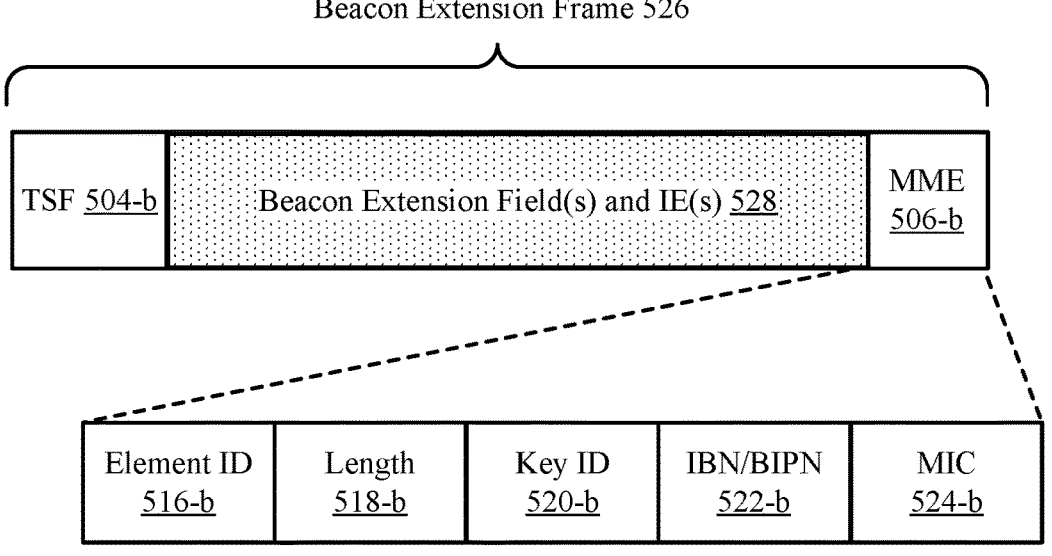

FIGS. 5A and 5B show examples of a frame structure 500-a and a frame structure 500-b that support protecting TSF values with security parameters. In some examples, aspects of the frame structure 500-a and the frame structure 500-b may implement or be implemented by aspects of the wireless communication network 100, the PDU 200, or a PPDU. For example, the frame structure 500-a and the frame structure 500-b may be implemented by an AP 102 or a STA 104, which may be examples of the corresponding devices as described with reference to FIG. 1.

As illustrated with reference to FIG. 5A, a beacon frame 502 may include one or more fields. That is, an AP may transmit a beacon frame 502 to a STA indicating information such as a TSF 504-a (which may be an example of a time component) indicating an actual time at which the beacon frame 502 was transmitted, a Beacon Interval (BI) 508 indicating a time interval during which the beacon frame 502 was transmitted, a capability information (CAP) field 510, one or more IEs 512 (such as an IE 512-a through an IE 512-n) comprising information for the STA, one or more VS IEs 514 (such as a VS IE 514-a through a VS IE 514-n), and an MME 506-a. In some examples the beacon frame 502 may not include the one or more VS IEs 514.

The MME 506-a may be a last element in the beacon frame 502 (such as after each field protected by the MME 506-a) and may comprise information for the STA to perform a security check on one or more other fields of the beacon frame 502 (such as specified by a broadcast/multicast integrity protocol (BIP)). For example, the MME 506-a may include one octet for an element identifier (ID) 516-a, one octet for a length 518-a, two octets for a key ID 520-a, six octets for a PN (such as an integrity group transient key PN (IPN) or a beacon integrity group temporal key PN (BIPN) 522-a), and eight or sixteen octets for a MIC 524-a. The MIC 524-a may be a security parameter for the STA to perform an integrity check of the beacon frame 502. For example, the STA may receive the MME 506-a from the AP and may use the security parameters in the MME 506-a to compute an MIC (such as the MIC 524-a). For example, the key ID 520-a may be an ID of a key (of a group of keys) advertised by the AP. The STA may use the key ID 520 and the IBN/IBPN 522-a to generate the MIC 524-a to verify a validity of the contents of the beacon frame 502.

The MIC 524-a may provide integrity-based protection for the contents of the beacon frame 502 (such as the contents preceding the MME 506-a). However, the AP may generate the MIC 524-a without considering the TSF 504-a. That is, the AP may populate the TSF 504-a field after populating the rest of the fields of the beacon frame 502 (via hardware at a last minute prior to transmitting the beacon frame 502). Accordingly, the AP may generate the MIC 524-a for the rest of the beacon frame 502 (for example excluding the TSF 504-a) ahead of time, when firmware of the AP populates the remainder of the beacon frame 502.

In some examples, the AP and/or the STA may use the TSF 504-a for one or more purposes (such as to enhance security and provide protection for control frames and fields in a MAC header). For example, the AP and/or the STA may use at least a portion of the TSF 504-a when generating a PN (such as for enhanced replay protection). In some examples, the TSF 504-a of a beacon frame 502 transmitted by an AP may be used for one or more other features (such as for r-TWT or coordinated r-TWT (cr-TWT)). Accordingly, the AP may protect the TSF 504-a via another security parameter (such as another MIC 524).

In some examples, the AP may protect a TSF 504 by generating a security parameter (such as an MIC, an MME, one or more fields of the MME such as the PN or key ID, an encryption parameter) using the TSF 504. The AP may include the security parameter in a field of a beacon extension frame 526. Such techniques are described in further detail with reference to FIG. 6. Additionally, or alternatively, the AP may protect a TSF 504 in a field (such as an IE or a VS IE) of the beacon frame 502. Such techniques are described in further detail with reference to FIG. 7. The protected TSF 504 may be a TSF indicating an actual transmission time of a first frame (such as the beacon frame), an actual transmission time of a second frame (such as the beacon extension frame), or a different time (such as a time epoch such as a TBTT or a probe response frame time). In some examples, the AP may transmit an indication of a security scheme to the STA. That is, the AP may indicate, to the STA, which frame the AP will include a security parameter in and/or which TSF 504 is protected by the security parameter. The described techniques may be backwards compatible such that some STAs (such as legacy STAs) may receive or detect beacon frames 502, but may not receive or detect the security parameters generated using the TSF.

As illustrated with reference to FIG. 5B, the AP may transmit a beacon extension frame 526 (such as a frame for offloading one or more fields of the beacon frame 502). For example, the beacon extension frame 526 may include one or more fields (such as beacon extension fields and IEs 528) indicating information that the AP may generate for the beacon frame 502. In some examples, the beacon extension frame may additionally, or alternatively, include a TSF 504-b (a time component) indicating an actual time at which the beacon frame 502 was transmitted and an MME 506-b.

The MME 506-b may be a last element in the beacon extension frame 526 and may comprise information for the STA to perform a security check on one or more other fields of the beacon extension frame 526. For example, the MME 506-b may include one octet for an element ID 516-b, one octet for a length 518-b, two octets for a key ID 520-b, six octets for a PN (such as an IPN/BIPN 522-b), and eight or sixteen octets for a MIC 524-b. The MIC 524-b may be a security parameter for the STA to perform an integrity check of the beacon extension frame 526. For example, the STA may receive the MME 506-b from the AP and may use the security parameters in the MME 506-b to compute an MIC (such as the MIC 524-b) to perform the integrity check.

In some examples, the beacon extension frame 526 may have a periodicity that is different from (such as longer than) the beacon frame 502. That is, the AP may transmit beacon frames 502 more frequently than beacon extension frames 526.

Figure 6:
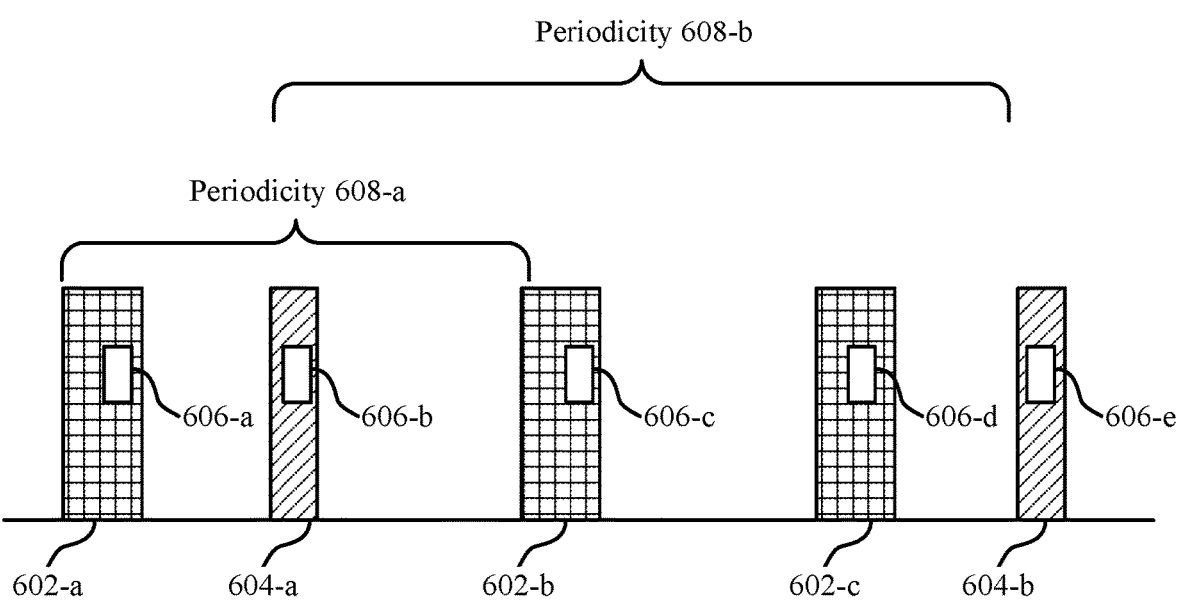
FIG. 6 shows an example of a timing diagram that illustrates communications between at least two wireless devices, such as a wireless AP and one or more wireless STAs, and that supports protecting TSF values with security parameters.
Figure 6:
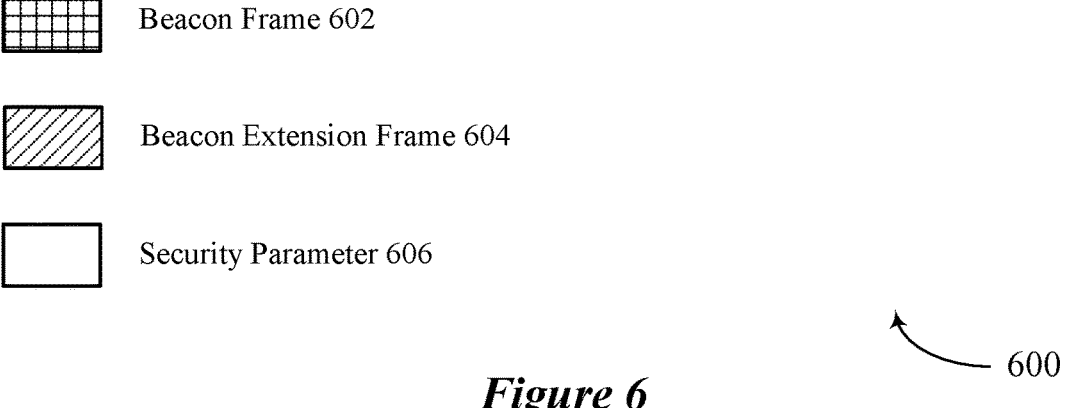

FIG. 6 shows an example of a timing diagram 600 that supports protecting TSF values with security parameters. In some examples, aspects of the timing diagram 600 may implement or be implemented by aspects of the wireless communication network 100, the PDU 200, the PPDU 300, the PPDU 400, the frame structure 500-*a*, or the frame structure 500-*b*. For example, the timing diagram 600 may be implemented by an AP such as AP 102 or the STAs such as STA 104, which may be examples of the corresponding devices as described with reference to FIG. 1.

In some examples, the AP may protect a TSF by generating a security parameter 606 (such as an MIC, an MME, one or more fields of the MME used to generate the MIC such as a PN or key ID, an encryption parameter) using the TSF. The AP may include the security parameter 606 generated using the TSF in a beacon extension frame 604 (such as a frame used for offloading a beacon frame 602). In some examples, one or more STAs (such as legacy STAs) may not detect the beacon extension frames 604 or one or more elements included in the beacon extension frames 604.

As an illustrative example, the AP may generate a beacon frame 602-*a* including one or more fields, as illustrated with reference to FIG. 5. The beacon frame 602-*a* may include one or more security parameters 606-*a* protecting one or more fields of the beacon frame 602-*a* (for example excluding a TSF of the beacon frame 602-*a*). The AP may generate a beacon extension frame 604-*a* (for example to offload information from the beacon frame 602-*a*) including a security parameter 606-*b* (such as in an IE of the beacon extension frame 602-*a*). The AP may generate the security parameter 606-*b* using a TSF of the beacon extension frame 604-*a* (such as an actual transmission time of the beacon extension frame 602-*a*) and/or the TSF of the beacon frame 602-*a* (such as an actual transmission time of the beacon frame 602-*a*). The AP may, additionally, or alternatively, protect one or more other fields of the beacon extension frame 604-*a* (such as via the security parameter 606-*b* or another security parameter 606).

The STA may receive the beacon extension frame 604-*a* and may use the security parameter 606-*b* to perform a security check of the beacon frame 602-*a* and/or the beacon extension frame 604-*a*. That is, based on determining the TSF information protected by the security parameter 606-*b*, the STA may determine to trust the beacon frame 602-*a* and/or the beacon extension frame 604-*a*. Accordingly, the AP may protect TSF information in the beacon extension frame 604-*a* via the security parameter 606-*b* (such as an MIC generated across all fields of the beacon extension frame 604-*a*, including a TSF field). In some examples, a TSF of the beacon extension frame 604-*a* may have a relatively higher granularity than the TSF of the beacon frame 602-*a* (for example more granular than 1 microsecond, such as 1 nanosecond).

In some examples, the beacon frames 602 may have a first periodicity 608-*a* that is different from (such as shorter than) a periodicity 608-*b* of the beacon extension frames 602. For example, the AP may transmit two or more beacon frames 602 (such as a beacon frame 602-*b* and a beacon frame 602-*c* including a security parameter 606-*c* and a security parameter 606-*d*) before transmitting another beacon extension frame 604-*b* (such as including a security parameter 606-*e* generated using a TSF of the beacon extension frame 604-*b* and/or the beacon frame 602-*c*).

Accordingly, the STA may determine a threshold time period following the beacon extension frame 604-*a* to trust one or more frames from the AP. For example, based on success of an integrity check of the beacon extension frame 604-*a* (such as using the security parameter 606-*b*), the STA may determine to trust another frame (such as the beacon extension frame 602-*b*) within the threshold time period from the beacon extension frame 604-*a*.

Figure 7:
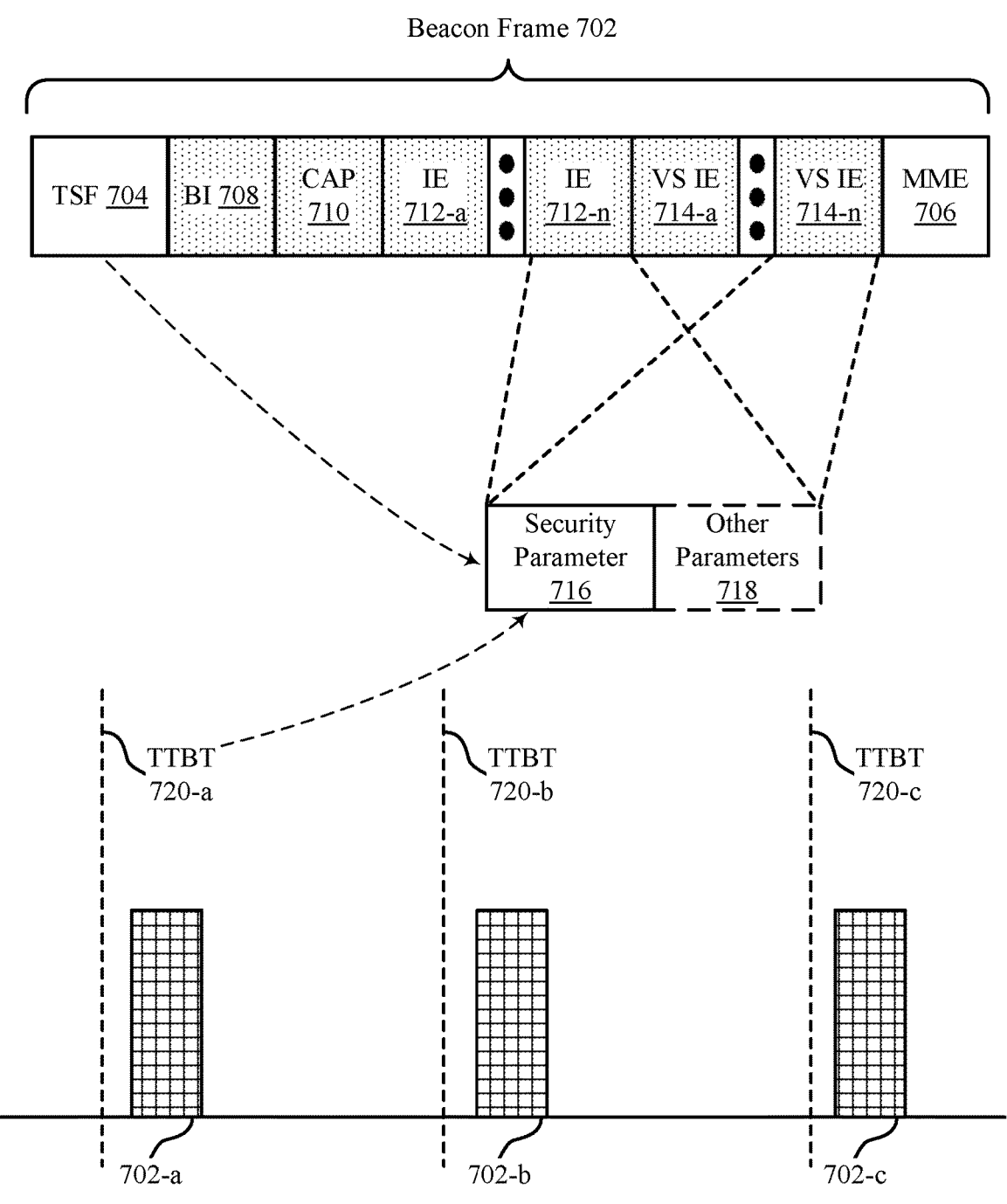
FIG. 7 shows an example of a timing diagram that illustrates communications between at least two wireless devices, such as a wireless AP and one or more wireless STAs, and that supports protecting TSF values with security parameters.

FIG. 7 shows an example of a timing diagram 700 that supports protecting TSF values with security parameters. In some examples, aspects of the timing diagram 700 may implement or be implemented by aspects of the wireless communication network 100, the PDU 200, the PPDU 300, the PPDU 400, the frame structure 500-*a*, the frame structure 500-*b*, or the timing diagram 600. For example, the timing diagram 700 may be implemented by an AP such as AP 102 or a STA such as STA 104, which may be examples of the corresponding devices as described with reference to FIG. 1.

In some examples, the AP may protect a TSF associated with a beacon frame 702 via one or more IEs of the beacon frame 702. As described with reference to FIG. 5, the beacon frame 702 may include information such as a TSF 704 (a time component) indicating an actual time at which the beacon frame 702 was transmitted, a BI 708 indicating a time interval during which the beacon frame 702 was transmitted, a CAP field 710, one or more IEs 712 (such as an IE 712-*a* through an IE 712-*n*) comprising information for an STA, one or more VS IEs 714 (such as a VS IE 714-*a* through a VS IE 714-*n*), and an MME 706.

In some examples, the AP may generate a security parameter 716 (such as an MIC, an MME, one or more fields of the MME such as the PN or key ID, an encryption parameter) using the TSF 704 (such as the actual transmission time of the beacon frame 702). That is, the AP may generate the security parameter 716 (in addition to or instead of as the MME 706 including an MIC generated across the fields of the beacon frame 702) in real-time. The AP may include the security parameter 716 in the IE 712-*n* (such as an existing or legacy IE 712-*n* or a new IE 712-*n*). That is, the AP may reuse one or more fields of the IE 712-*n* or extend the IE 712-*n* to include the security parameter 716. In some examples, the IE 712-*n* may include one or more other parameters 718 (such as other security parameters or other non-security related parameters).

Additionally, or alternatively, the AP may include the security parameter 716 in the VS IE 714-*n* (such as a last VS IE 714-*n* of the one or more VS IEs 714). That is, the AP may use an organization unique identifier (OUI) (such as a new OUI) to designate the VS IE 714-*n* as an IE carrying the security parameter 716. In some examples, the VS IE 714-*n* may be extendible to include one or more other parameters 718 (such as other security parameters or other information). Some STAs (such as legacy STAs) may not detect or use information in the VS IE 714-*n* (for example based on being unfamiliar with the new OUI).

In some examples, the AP may provide reasonable protection of the TSF 704 by generating the security parameter 716 using a TSF associated with a fixed and/or recurring time epoch during an operation of the AP (such as a TBTT 720 of the beacon frame 702, a probe response frame) in addition to or instead of a TSF associated with an actual transmission time of the beacon frame 702. The recurring time epoch may be associated with a periodicity (such as 100 milliseconds (ms) for a TBTT 720, 20 ms for a probe response frame). For example, the AP may generate a security parameter 716 for a beacon frame 702-*a* using a TBTT 720-*a* of the beacon frame 702-*a*, a security parameter 716 for a beacon frame 702-*b* using a TBTT 720 of the beacon frame 702-*b*, a security parameter 716 for a beacon frame 702-*c* using a TBTT 720-*c* of the beacon frame 702-*c*, and so on.

In such examples, the AP may compute the security parameter 716 using software of firmware ahead of time (for example prior to transmission of the beacon frame 702 rather than in real-time). The AP may include the security parameter 716 (such as and one or more additional parameters 718, such as security parameters) in an IE 712-*n* and/or a VS IE 714-*n*, as described above, during construction of the beacon frame 702. By generating the security parameter 716 using the TSF and including the security parameter 716 in an IE 712 or a VS IE 714 of the beacon frames 702, the AP may increase security by causing the STA to validate the TSF for each beacon frame 702 (such as at each TBTT).

Figure 8:
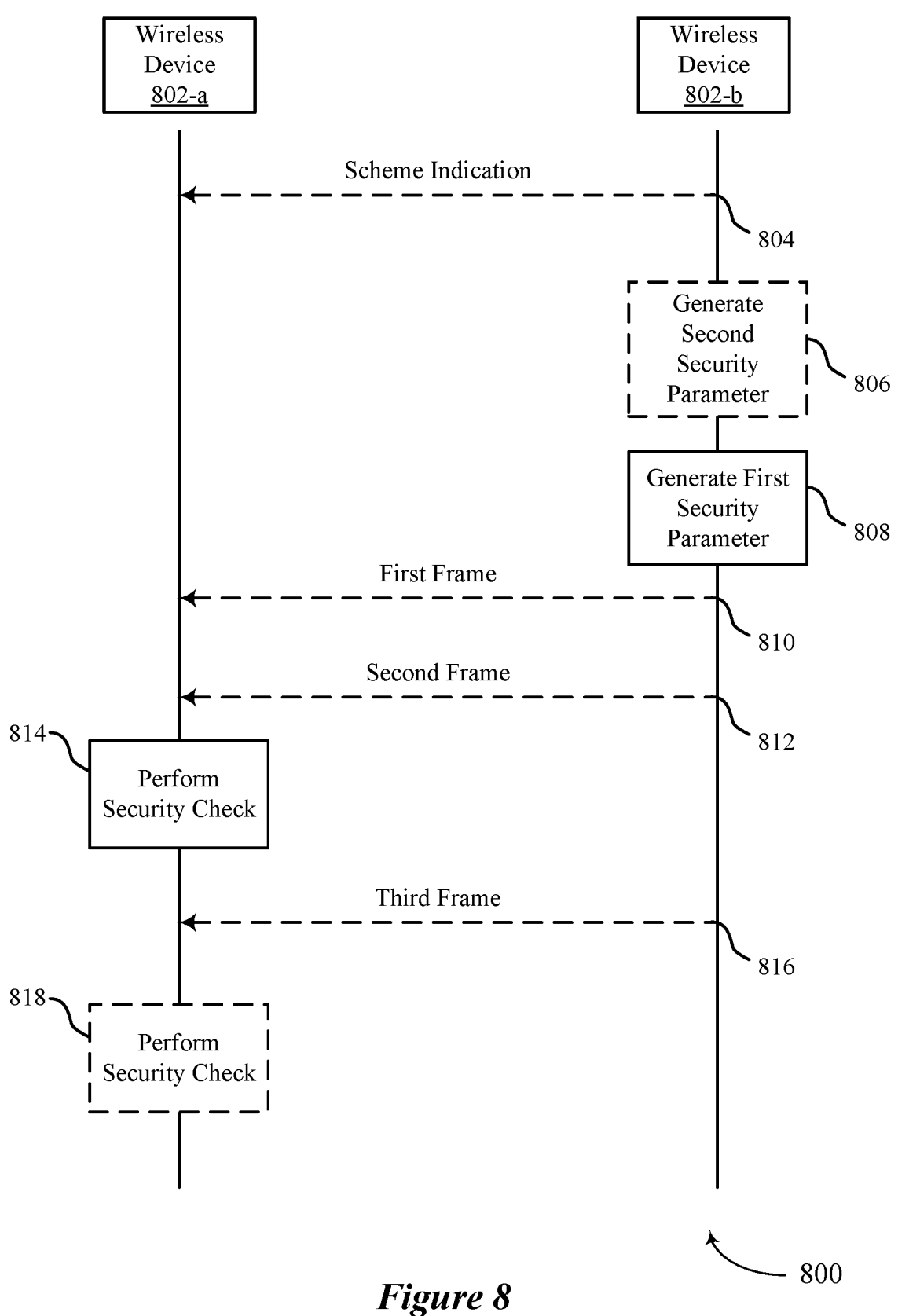
FIG. 8 shows an example of a process flow that supports communications between at least two wireless devices, such as a wireless AP and a wireless STA, that supports protecting TSF values with security parameters.

FIG. 8 shows an example of a process flow 800 that supports protecting TSF values with security parameters. In some examples, aspects of the process flow 800 may implement or be implemented by aspects of the wireless communication network 100, the PDU 200, the PPDU 300, the PPDU 400, the frame structure 500-*a*, the frame structure 500-*b*, the timing diagram 600, or the timing diagram 700. For example, the process flow 800 may be implemented by a wireless device 802-*a* and a wireless device 802-*b*, which may be examples of an AP 102 or a STA 104, which may be examples of the corresponding devices as described with reference to FIG. 1.

In the following description of the process flow 800, the operations between the wireless device 802-*a* and the wireless device 802-*b* may be transmitted in a different order than the example order shown. Some operations also may be omitted from the process flow 800, and other operations may be added to the process flow 800. Further, although some operations or signaling may be shown to occur at different times for discussion purposes, these operations may actually occur at the same time.

In some examples, at 804, the wireless device 802-*b* may transmit, to the wireless device 802-*a*, an indication of a security scheme used by the wireless device 802-*b*. The security scheme may indicate a method for the wireless device 802-*b* to generate and/or transmit a security parameter (such as an MIC, an MME, an encryption parameter, a key ID, a PN) associated with a TSF to the wireless device 802-*a*. For example, the security scheme may indicate a frame used for transmitting the security parameter (such as a beacon frame, a beacon extension frame, or another frame), and/or a TSF used to generate the security parameter (such as a TSF of the frame used to transmit the security parameter, a TSF of another frame, a TSF of a fixed or recurring time epoch).

In some examples, at 806 and 808, the wireless device 802-*b* may generate a second security parameter and a first security parameter (for example different from the second security parameter), respectively. In some examples, the second security parameter may be a security parameter generated based on one or more fields of a first frame (such as a beacon frame). That is, the second security parameter may be a MIC, an encryption parameter, or one or more parameters for generating the MIC (such as a key ID, a PN, an MME comprising the key ID and PN) to protect one or more IEs or other fields of the beacon frame.

In some examples, the first security parameter may be a security parameter generated using a TSF value according to the security scheme. For example, the first security parameter may be a security parameter (such as an MIC, an MME, an encryption parameter, a key ID, a PN) generated using a TSF associated with an actual transmission time of the first frame or of a second frame or a TSF of one or more fixed or recurring epochs (such as a TBTT associated with the first frame) as indicated via the security scheme indication. In some examples, the wireless device 802-*b* may generate the first security parameter according to the security scheme without transmitting the scheme indication.

In some examples, at 810, the wireless device 802-*b* may transmit a first frame (such as the beacon frame) to the wireless device 802-*a* according to the transmission time, which may be offset from the TBTT of the first frame. The first frame may comprise the second security parameter (such as via an MME field of the first frame). In some examples, the first frame may comprise the first security parameter. That is, the wireless device 802-*b* may transmit the first security parameter via an IE of the first frame. The IE may be a VS IE (such as a last VS IE prior to the MME field of the first frame) or another IE (such as a new IE or a reused IE). In some examples, the VS IE may comprise one or more additional parameters (such as one or more additional security parameters, one or more other parameters).

In some examples, the first security parameter may be the security parameter generated using a TSF value according to the security scheme. For example, the first security parameter may be a security parameter (such as an MIC, an MME, an encryption parameter, a key ID, a PN) generated using a TSF associated with an actual transmission time of the first frame or of the second frame or a TSF of one or more fixed or recurring epochs (such as a TBTT associated with the first frame) as indicated via the security scheme indication. In some examples, the wireless device 802-*b* may generate the first security parameter according to the security scheme without transmitting the scheme indication.

In some examples, at 812, the wireless device 802-*b* may transmit a second frame (such as a beacon extension frame or one or more other frames) to the wireless device 802-*a*. The wireless device 802-*b* may transmit the first security parameter via an IE or another field of the second frame (such as the first security parameter generated using the TSF of the first frame or the second frame). In some examples, the second frame may have a second periodicity different from a first periodicity of the first frame. The second frame may be a frame used to offload one or more fields (such as IEs) from the first frame.

At 814, the wireless device 802-*a* may perform a first security check of the first frame and/or the second frame using the first security parameter to authenticate the TSF value. In some examples, the wireless device 802-*a* may use the first security parameter to identify or generate an MIC associated with a TSF field (such as the TSF associated with the actual transmission time of the first frame or the second frame or a TSF of another time epoch). The wireless device 802-*a* may verify one or more aspects of the first frame and/or the second frame using the first security parameter. For example, the wireless device 802-*a* may decrypt one or more fields of the first frame or the second frame, or may determine to trust the first frame or the second frame. As an illustrative example, the wireless device 802-*b* may receive the first security parameter as an MME comprising a MIC value generated by the wireless device 802-*a* using the TSF and one or more parameters (such as a key ID or a PN) for the wireless device 802-*b* to compute a MIC value via the first frame. The wireless device may compute a MIC value using the key ID and PN. If the wireless device 802-*b* determines that the computed MIC value matches the MIC value received via the first frame, the wireless device 802-*b* may determine that the first frame and/or one or more other frames was transmitted by the AP.

In some examples, at 816, the wireless device 802-*b* may transmit a third frame to the wireless device 802-*a*. The third frame may be, for example, a second beacon frame (such as a frame associated with the first periodicity). In some examples, at 818, the wireless device 802-*a* may perform a second security check of the third frame based at least in part on an outcome of the first security check. For example, if the wireless device 802-*a* receives the third frame within a time period (such as a threshold time difference) of receiving the second frame, the wireless device 802-*a* may determine to trust the third frame based on a success of the first security check.

Figure 9:
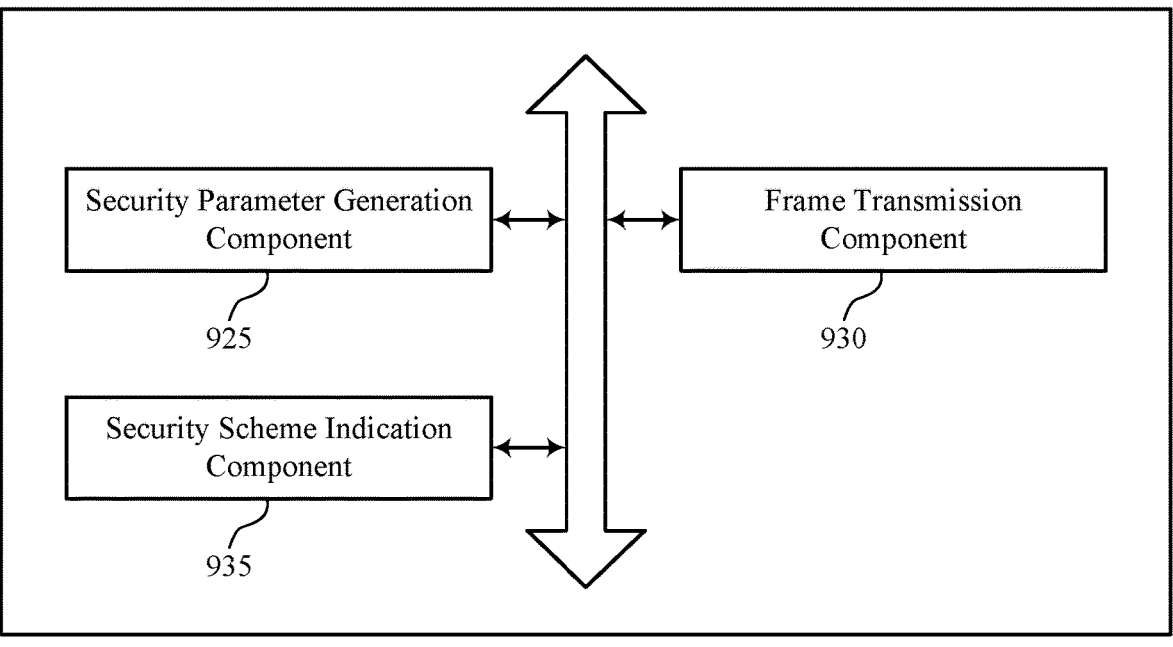
FIG. 9 shows a block diagram of an example wireless communication device that supports protecting TSF values with security parameters.

FIG. 9 shows a block diagram of an example wireless communication device 900 (such as an AP) that supports protecting TSF values with security parameters. In some examples, the wireless communication device 900 is configured to perform the processes 1100, 1200, and 1300 described with reference to FIGS. 11, 12, and 13, respectively. The wireless communication device 900 may include one or more chips, SoCs, chipsets, packages, components or devices that individually or collectively constitute or include a processing system. The processing system may interface with other components of the wireless communication device 900, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 900 may transmit the information output from the chip. In such an example, the second interface may refer to an interface between the processing system of the chip and a reception component, such that the wireless communication device 900 may receive information that is then passed to the processing system. In some such examples, the first interface also may obtain information, such as from the transmission component, and the second interface also may output information, such as to the reception component.

The processing system of the wireless communication device 900 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 900 can be configurable or configured for use in an AP, such as the AP 102 described with reference to FIG. 1. In some other examples, the wireless communication device 900 can be an AP that includes such a processing system and other components including multiple antennas. The wireless communication device 900 is capable of transmitting and receiving wireless communications in the form of, for example, wireless packets. For example, the wireless communication device 900 can be configurable or configured to transmit and receive packets in the form of physical layer PPDUs and MPDUs conforming to one or more of the IEEE 802.11 family of wireless communication protocol standards. In some other examples, the wireless communication device 900 can be configurable or configured to transmit and receive signals and communications conforming to one or more 3GPP specifications including those for 5G NR or 6G. In some examples, the wireless communication device 900 also includes or can be coupled with one or more application processors which may be further coupled with one or more other memories. In some examples, the wireless communication device 900 further includes at least one external network interface coupled with the processing system that enables communication with a core network or backhaul network that enables the wireless communication device 900 to gain access to external networks including the Internet.

The wireless communication device 900 includes a security parameter generation component 925, a frame transmission component 930, and a security scheme indication component 935. Portions of one or more of the security parameter generation component 925, the frame transmission component 930, and the security scheme indication component 935 may be implemented at least in part in hardware or firmware. For example, one or more of the security parameter generation component 925, the frame transmission component 930, and the security scheme indication component 935 may be implemented at least in part by at least a processor or a modem. In some examples, portions of one or more of the security parameter generation component 925, the frame transmission component 930, and the security scheme indication component 935 may be implemented at least in part by a processor and software in the form of processor-executable code stored in memory.

The wireless communication device 900 may support wireless communications in accordance with examples as disclosed herein. The security parameter generation component 925 is configurable or configured to generate a first security parameter in accordance with a TSF value associated with a transmission time of a first frame or a second frame. The frame transmission component 930 is configurable or configured to transmit the first frame or the second frame according to the transmission time, the first frame or the second frame including the first security parameter generated using the TSF value.

In some examples, to support transmitting the first frame or the second frame according to the transmission time, the frame transmission component 930 is configurable or configured to transmit the first security parameter via the second frame including the first security parameter. In some examples, to support transmitting the first frame or the second frame according to the transmission time, the frame transmission component 930 is configurable or configured to transmit, via the first frame, a second security parameter associated with the first frame and different from the first security parameter.

In some examples, the first frame is a beacon frame and the second frame is a beacon extension frame. In some examples, a first periodicity of the first frame is different from a second periodicity of the second frame.

In some examples, to support transmitting the first frame or the second frame according to the transmission time, the frame transmission component 930 is configurable or configured to transmit the first security parameter via an information element of the first frame.

In some examples, the information element is a vendor-specific information element.

In some examples, the information element is a last vendor-specific information element prior to a MME of the first frame. In some examples, the MME of the first frame contains the second security parameter.

In some examples, the TSF value indicates a target beacon transmission time associated with the first frame. In some examples, the transmission time is offset from the target beacon transmission time.

In some examples, to support transmitting the first frame or the second frame according to the transmission time, the frame transmission component 930 is configurable or configured to transmit the first security parameter via an information element of the first frame or of the second frame, where the TSF value indicates an actual transmission time of the first frame or of the second frame, and where the security parameter is included in a corresponding one of the first frame or the second frame.

In some examples, the security scheme indication component 935 is configurable or configured to transmit an indication of a security scheme associated with the first security parameter, where transmitting the first frame or the second frame including the first security parameter is in accordance with the security scheme.

In some examples, the first security parameter includes a MIC parameter, an encryption parameter, a key identifier, a packet number, or a MME.

Figure 10:
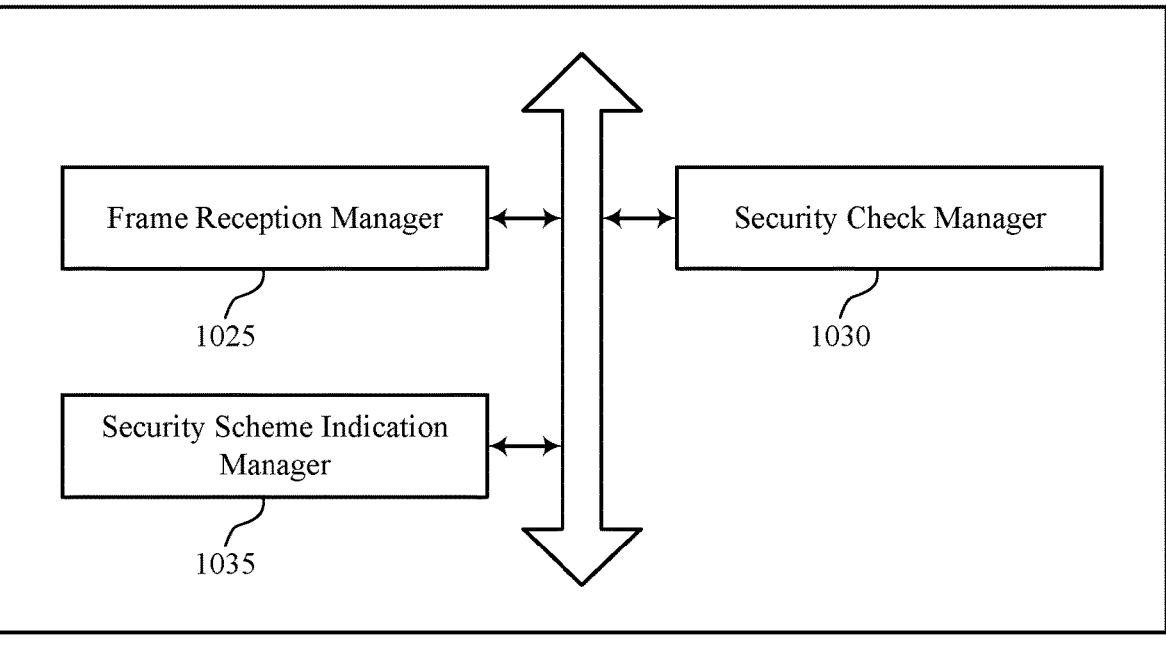
FIG. 10 shows a block diagram of an example wireless communication device that includes one or more components for communicating frames (such as beacon frames) and that supports protecting TSF values with security parameters.
Figure 10:
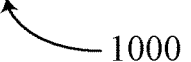

FIG. 10 shows a block diagram of an example wireless communication device 1000 (such as an STA) that supports protecting TSF values with security parameters. In some examples, the wireless communication device 1000 is configured to perform the processes 1400, 1500, and 1600 described with reference to FIGS. 14, 15, and 16, respectively. The wireless communication device 1000 may include one or more chips, SoCs, chipsets, packages, components or devices that individually or collectively constitute or include a processing system. The processing system may interface with other components of the wireless communication device 1000, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1000 may transmit the information output from the chip. In such an example, the second interface may refer to an interface between the processing system of the chip and a reception component, such that the wireless communication device 1000 may receive information that is then passed to the processing system. In some such examples, the first interface also may obtain information, such as from the transmission component, and the second interface also may output information, such as to the reception component.

The processing system of the wireless communication device 1000 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1000 can be configurable or configured for use in a STA, such as the STA 104 described with reference to FIG. 1. In some other examples, the wireless communication device 1000 can be a STA that includes such a processing system and other components including multiple antennas. The wireless communication device 1000 is capable of transmitting and receiving wireless communications in the form of, for example, wireless packets. For example, the wireless communication device 1000 can be configurable or configured to transmit and receive packets in the form of physical layer PPDUs and MPDUs conforming to one or more of the IEEE 802.11 family of wireless communication protocol standards. In some other examples, the wireless communication device 1000 can be configurable or configured to transmit and receive signals and communications conforming to one or more 3GPP specifications including those for 5G NR or 6G. In some examples, the wireless communication device 1000 also includes or can be coupled with one or more application processors which may be further coupled with one or more other memories. In some examples, the wireless communication device 1000 further includes a user interface (UI) (such as a touchscreen or keypad) and a display, which may be integrated with the UI to form a touchscreen display that is coupled with the processing system. In some examples, the wireless communication device 1000 may further include one or more sensors such as, for example, one or more inertial sensors, accelerometers, temperature sensors, pressure sensors, or altitude sensors, that are coupled with the processing system.

The wireless communication device 1000 includes a frame reception manager 1025, a security check manager 1030, and a security scheme indication manager 1035. Portions of one or more of the frame reception manager 1025, the security check manager 1030, and the security scheme indication manager 1035 may be implemented at least in part in hardware or firmware. For example, one or more of the frame reception manager 1025, the security check manager 1030, and the security scheme indication manager 1035 may be implemented at least in part by at least a processor or a modem. In some examples, portions of one or more of the frame reception manager 1025, the security check manager 1030, and the security scheme indication manager 1035 may be implemented at least in part by a processor and software in the form of processor-executable code stored in memory.

The wireless communication device 1000 may support wireless communications in accordance with examples as disclosed herein. The frame reception manager 1025 is configurable or configured to receive a first frame or a second frame according to a transmission time, the first frame or the second frame including a first security parameter generated using a TSF value associated with the transmission time. The security check manager 1030 is configurable or configured to perform a first security check in accordance with the first security parameter to authenticate the TSF value.

In some examples, to support receiving the first frame or the second frame according to the transmission time, the frame reception manager 1025 is configurable or configured to receive the first security parameter via the second frame including the first security parameter. In some examples, to support receiving the first frame or the second frame according to the transmission time, the frame reception manager 1025 is configurable or configured to receive, via the first frame, a second security parameter associated with the first frame and different from the first security parameter.

In some examples, the security check manager 1030 is configurable or configured to perform a second security check of a third frame in accordance with a success of the first security check and in accordance with a threshold time difference between reception of the second frame and reception of the third frame.

In some examples, a first periodicity of the first frame is different from a second periodicity of the second frame.

In some examples, to support receiving the first frame or the second frame according to the transmission time, the frame reception manager 1025 is configurable or configured to receive the first security parameter via an information element of the first frame.

In some examples, the information element is a vendor-specific information element.

In some examples, the information element is a last vendor-specific information element prior to a MME of the first frame. In some examples, the MME of the first frame contains the second security parameter.

In some examples, the TSF value indicates a target beacon transmission time associated with the first frame. In some examples, the transmission time is offset from the target beacon transmission time.

In some examples, to support receiving the first frame or the second frame according to the transmission time, the frame reception manager 1025 is configurable or configured to receive the first security parameter via an information element of the first frame or of the second frame, where the TSF value indicates an actual transmission time of the first frame or of the second frame, and where the security parameter is included in a corresponding one of the first frame or the second frame.

In some examples, the security scheme indication manager 1035 is configurable or configured to receive an indication of a security scheme associated with the first security parameter, where receiving the first frame or the second frame including the first security parameter is in accordance with the security scheme.

In some examples, the first security parameter includes a MIC parameter, an encryption parameter, a key identifier, a packet number, or a MME.

FIG. 11 shows a flowchart illustrating an example process 1100 performable by or at a wireless device that supports protecting TSF values with security parameters. The operations of the process 1100 may be implemented by a wireless device or its components as described herein. For example, the process 1100 may be performed by a wireless communication device, such as the wireless communication device 900 described with reference to FIG. 9, operating as or within a wireless AP. In some examples, the process 1100 may be performed by a wireless AP, such as one of the APs 102 described with reference to FIG. 1.

In some examples, in 1102, the wireless device may generate a first security parameter in accordance with a TSF value associated with a transmission time of a first frame or a second frame. The operations of 1102 may be performed in accordance with examples as disclosed herein. In some implementations, aspects of the operations of 1102 may be performed by a security parameter generation component 925 as described with reference to FIG. 9.

In some examples, in 1104, the wireless device may transmit the first frame or the second frame according to the transmission time, the first frame or the second frame including the first security parameter generated using the TSF value. The operations of 1104 may be performed in accordance with examples as disclosed herein. In some implementations, aspects of the operations of 1104 may be performed by a frame transmission component 930 as described with reference to FIG. 9.

FIG. 12 shows a flowchart illustrating an example process 1200 performable by or at a wireless device that supports protecting TSF values with security parameters. The operations of the process 1200 may be implemented by a wireless device or its components as described herein. For example, the process 1200 may be performed by a wireless communication device, such as the wireless communication device 900 described with reference to FIG. 9, operating as or within a wireless AP. In some examples, the process 1200 may be performed by a wireless AP, such as one of the APs 102 described with reference to FIG. 1.

In some examples, in 1202, the wireless device may generate a first security parameter in accordance with a TSF value associated with a transmission time of a first frame or a second frame. The operations of 1202 may be performed in accordance with examples as disclosed herein. In some implementations, aspects of the operations of 1202 may be performed by a security parameter generation component 925 as described with reference to FIG. 9.

In some examples, in 1204, the wireless device may transmit the first frame or the second frame according to the transmission time, the first frame or the second frame including the first security parameter generated using the TSF value. The operations of 1204 may be performed in accordance with examples as disclosed herein. In some implementations, aspects of the operations of 1204 may be performed by a frame transmission component 930 as described with reference to FIG. 9.

In some examples, in 1206, the wireless device may transmit the first security parameter via the second frame including the first security parameter. The operations of 1206 may be performed in accordance with examples as disclosed herein. In some implementations, aspects of the operations of 1206 may be performed by a frame transmission component 930 as described with reference to FIG. 9.

In some examples, in 1208, the wireless device may transmit, via the first frame, a second security parameter associated with the first frame and different from the first security parameter. The operations of 1208 may be performed in accordance with examples as disclosed herein. In some implementations, aspects of the operations of 1208 may be performed by a frame transmission component 930 as described with reference to FIG. 9.

FIG. 13 shows a flowchart illustrating an example process 1300 performable by or at a wireless device that supports protecting TSF values with security parameters. The operations of the process 1300 may be implemented by a wireless device or its components as described herein. For example, the process 1300 may be performed by a wireless communication device, such as the wireless communication device 900 described with reference to FIG. 9, operating as or within a wireless AP. In some examples, the process 1300 may be performed by a wireless AP, such as one of the APs 102 described with reference to FIG. 1.

In some examples, in 1302, the wireless device may generate a first security parameter in accordance with a TSF value associated with a transmission time of a first frame or a second frame. The operations of 1302 may be performed in accordance with examples as disclosed herein. In some implementations, aspects of the operations of 1302 may be performed by a security parameter generation component 925 as described with reference to FIG. 9.

In some examples, in 1304, the wireless device may transmit the first frame or the second frame according to the transmission time, the first frame or the second frame including the first security parameter generated using the TSF value. The operations of 1304 may be performed in accordance with examples as disclosed herein. In some implementations, aspects of the operations of 1304 may be performed by a frame transmission component 930 as described with reference to FIG. 9.

In some examples, in 1306, the wireless device may transmit the first security parameter via an information element of the first frame. The operations of 1306 may be performed in accordance with examples as disclosed herein.

In some implementations, aspects of the operations of 1306 may be performed by a frame transmission component 930 as described with reference to FIG. 9.

FIG. 14 shows a flowchart illustrating an example process 1400 performable by or at a wireless device that supports protecting TSF values with security parameters. The operations of the process 1400 may be implemented by a wireless device or its components as described herein. For example, the process 1400 may be performed by a wireless communication device, such as the wireless communication device 1000 described with reference to FIG. 10, operating as or within a wireless STA. In some examples, the process 1400 may be performed by a wireless STA, such as one of the STAs 104 described with reference to FIG. 1.

In some examples, in 1402, the wireless device may receive a first frame or a second frame according to a transmission time, the first frame or the second frame including a first security parameter generated using a TSF value associated with the transmission time. The operations of 1402 may be performed in accordance with examples as disclosed herein. In some implementations, aspects of the operations of 1402 may be performed by a frame reception manager 1025 as described with reference to FIG. 10.

In some examples, in 1404, the wireless device may perform a first security check in accordance with the first security parameter to authenticate the TSF value. The operations of 1404 may be performed in accordance with examples as disclosed herein. In some implementations, aspects of the operations of 1404 may be performed by a security check manager 1030 as described with reference to FIG. 10.

FIG. 15 shows a flowchart illustrating an example process 1500 performable by or at a wireless device that supports protecting TSF values with security parameters. The operations of the process 1500 may be implemented by a wireless device or its components as described herein. For example, the process 1500 may be performed by a wireless communication device, such as the wireless communication device 1000 described with reference to FIG. 10, operating as or within a wireless STA. In some examples, the process 1500 may be performed by a wireless STA, such as one of the STAs 104 described with reference to FIG. 1.

In some examples, in 1502, the wireless device may receive a first frame or a second frame according to a transmission time, the first frame or the second frame including a first security parameter generated using a TSF value associated with the transmission time. The operations of 1502 may be performed in accordance with examples as disclosed herein. In some implementations, aspects of the operations of 1502 may be performed by a frame reception manager 1025 as described with reference to FIG. 10.

In some examples, in 1504, the wireless device may perform a first security check in accordance with the first security parameter to authenticate the TSF value. The operations of 1504 may be performed in accordance with examples as disclosed herein. In some implementations, aspects of the operations of 1504 may be performed by a security check manager 1030 as described with reference to FIG. 10.

In some examples, in 1506, the wireless device may receive the first security parameter via the second frame including the first security parameter. The operations of 1506 may be performed in accordance with examples as disclosed herein. In some implementations, aspects of the operations of 1506 may be performed by a frame reception manager 1025 as described with reference to FIG. 10.

In some examples, in 1508, the wireless device may receive, via the first frame, a second security parameter associated with the first frame and different from the first security parameter. The operations of 1508 may be performed in accordance with examples as disclosed herein. In some implementations, aspects of the operations of 1508 may be performed by a frame reception manager 1025 as described with reference to FIG. 10.

FIG. 16 shows a flowchart illustrating an example process 1600 performable by or at a wireless device that supports protecting TSF values with security parameters. The operations of the process 1600 may be implemented by a wireless device or its components as described herein. For example, the process 1600 may be performed by a wireless communication device, such as the wireless communication device 1000 described with reference to FIG. 10, operating as or within a wireless STA. In some examples, the process 1600 may be performed by a wireless STA, such as one of the STAs 104 described with reference to FIG. 1.

In some examples, in 1602, the wireless device may receive a first frame or a second frame according to a transmission time, the first frame or the second frame including a first security parameter generated using a TSF value associated with the transmission time. The operations of 1602 may be performed in accordance with examples as disclosed herein. In some implementations, aspects of the operations of 1602 may be performed by a frame reception manager 1025 as described with reference to FIG. 10.

In some examples, in 1604, the wireless device may perform a first security check in accordance with the first security parameter to authenticate the TSF value. The operations of 1604 may be performed in accordance with examples as disclosed herein. In some implementations, aspects of the operations of 1604 may be performed by a security check manager 1030 as described with reference to FIG. 10.

In some examples, in 1606, the wireless device may receive the first security parameter via the second frame including the first security parameter. The operations of 1606 may be performed in accordance with examples as disclosed herein. In some implementations, aspects of the operations of 1606 may be performed by a frame reception manager 1025 as described with reference to FIG. 10.

In some examples, in 1608, the wireless device may receive, via the first frame, a second security parameter associated with the first frame and different from the first security parameter. The operations of 1608 may be performed in accordance with examples as disclosed herein. In some implementations, aspects of the operations of 1608 may be performed by a frame reception manager 1025 as described with reference to FIG. 10.

In some examples, in 1610, the wireless device may perform a second security check of a third frame in accordance with a success of the first security check and in accordance with a threshold time difference between reception of the second frame and reception of the third frame. The operations of 1610 may be performed in accordance with examples as disclosed herein. In some implementations, aspects of the operations of 1610 may be performed by a security check manager 1030 as described with reference to FIG. 10.

Implementation examples are described in the following numbered clauses:

Aspect 1: A method for wireless communications at a wireless device, comprising: generating a first security parameter in accordance with a TSF value associated with a transmission time of a first frame or a second frame; and transmitting the first frame or the second frame according to the transmission time, the first frame or the second frame including the first security parameter generated using the TSF value.

Aspect 2: The method of aspect 1, wherein transmitting the first frame or the second frame according to the transmission time comprises: transmitting the first security parameter via the second frame including the first security parameter; and transmitting, via the first frame, a second security parameter associated with the first frame and different from the first security parameter.

Aspect 3: The method of aspect 2, wherein the first frame is a beacon frame and the second frame is a beacon extension frame, and a first periodicity of the first frame is different from a second periodicity of the second frame.

Aspect 4: The method of aspect 1, wherein transmitting the first frame or the second frame according to the transmission time comprises: transmitting the first security parameter via an IE of the first frame.

Aspect 5: The method of aspect 4, wherein the IE is a VS IE.

Aspect 6: The method of any of aspects 4 through 5, wherein the IE is a last VS IE prior to a MME of the first frame, the MME of the first frame contains the second security parameter.

Aspect 7: The method of any of aspects 4 through 6, wherein the TSF value indicates a TBTT associated with the first frame, the transmission time is offset from the TBTT.

Aspect 8: The method of any of aspects 1 through 7, wherein transmitting the first frame or the second frame according to the transmission time comprises: transmitting the first security parameter via an IE of the first frame or of the second frame, wherein the TSF value indicates an actual transmission time of the first frame or of the second frame, and wherein the security parameter is included in a corresponding one of the first frame or the second frame.

Aspect 9: The method of any of aspects 1 through 8, further comprising: transmitting an indication of a security scheme associated with the first security parameter, wherein transmitting the first frame or the second frame including the first security parameter is in accordance with the security scheme.

Aspect 10: The method of any of aspects 1 through 9, wherein the first security parameter comprises a MIC parameter, an encryption parameter, a key ID, a PN, or a MME.

Aspect 11: A method for wireless communications at a wireless device, comprising: receiving a first frame or a second frame according to a transmission time, the first frame or the second frame including a first security parameter generated using a TSF value associated with the transmission time; and performing a first security check in accordance with the first security parameter to authenticate the TSF value.

Aspect 12: The method of aspect 11, wherein receiving the first frame or the second frame according to the transmission time comprises: receiving the first security parameter via the second frame including the first security parameter; and receiving, via the first frame, a second security parameter associated with the first frame and different from the first security parameter.

Aspect 13: The method of aspect 12, further comprising: performing a second security check of a third frame in accordance with a success of the first security check and in accordance with a threshold time difference between reception of the second frame and reception of the third frame.

Aspect 14: The method of any of aspects 12 through 13, wherein the first frame is a beacon frame and the second frame is a beacon extension frame, and wherein a first periodicity of the first frame is different from a second periodicity of the second frame.

Aspect 15: The method of aspect 12, wherein receiving the first frame or the second frame according to the transmission time comprises: receiving the first security parameter via an IE of the first frame.

Aspect 16: The method of aspect 15, wherein the IE is a VS IE.

Aspect 17: The method of any of aspects 15 through 16, wherein the IE is a last VS IE prior to a MME of the first frame, the MME of the first frame contains the second security parameter.

Aspect 18: The method of any of aspects 15 through 17, wherein the TSF value indicates a TBTT associated with the first frame, the transmission time is offset from the TBTT.

Aspect 19: The method of any of aspects 11 through 18, wherein receiving the first frame or the second frame according to the transmission time comprises: receiving the first security parameter via an IE of the first frame or of the second frame, wherein the TSF value indicates an actual transmission time of the first frame or of the second frame, and wherein the security parameter is included in a corresponding one of the first frame or the second frame.

Aspect 20: The method of any of aspects 11 through 19, further comprising: receiving an indication of a security scheme associated with the first security parameter, wherein receiving the first frame or the second frame including the first security parameter is in accordance with the security scheme.

Aspect 21: The method of any of aspects 11 through 20, wherein the first security parameter comprises a MIC parameter, an encryption parameter, a key ID, a PN, or a MME.

Aspect 22: A wireless device for wireless communications, comprising one or more memories storing processor-executable code, and one or more processors coupled with the one or more memories and individually or collectively operable to execute the code to cause the wireless device to perform a method of any of aspects 1 through 10.

Aspect 23: A wireless device for wireless communications, comprising at least one means for performing a method of any of aspects 1 through 10.

Aspect 24: A non-transitory computer-readable medium storing code for wireless communications, the code comprising instructions executable by one or more processors to perform a method of any of aspects 1 through 10.

Aspect 25: A wireless device for wireless communications, comprising one or more memories storing processor-executable code, and one or more processors coupled with the one or more memories and individually or collectively operable to execute the code to cause the wireless device to perform a method of any of aspects 11 through 21.

Aspect 26: A wireless device for wireless communications, comprising at least one means for performing a method of any of aspects 11 through 21.

Aspect 27: A non-transitory computer-readable medium storing code for wireless communications, the code comprising instructions executable by one or more processors to perform a method of any of aspects 11 through 21.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless device, comprising:
a processing system that includes processor circuitry and memory circuitry that stores code, the processing system configured to cause the wireless device to:
   generate a first message integrity check (MIC) parameter in accordance with a timing synchronization function (TSF) value associated with a transmission time of a beacon frame or a beacon extension frame; and
   transmit the beacon frame or the beacon extension frame according to the transmission time, the beacon frame or the beacon extension frame including the first MIC parameter generated using the TSF value, and the beacon frame including a second MIC parameter associated with the beacon frame and different from the first MIC parameter.

2. The wireless device of claim 1, wherein, to transmit the beacon frame or the beacon extension frame according to the transmission time, the processing system is configured to cause the wireless device to:
   transmit the first MIC parameter via the beacon extension frame including the first MIC parameter; and
   transmit, via the beacon frame, the second MIC parameter.

3. The wireless device of claim 2, wherein a first periodicity of the beacon frame is different from a second periodicity of the beacon extension frame.

4. The wireless device of claim 1, wherein, to transmit the beacon frame or the beacon extension frame according to the transmission time, the processing system is configured to cause the wireless device to:
   transmit the first MIC parameter via an information element of the beacon frame.

5. The wireless device of claim 4, wherein the TSF value indicates a target beacon transmission time associated with the beacon frame, and wherein the transmission time is offset from the target beacon transmission time.

6. The wireless device of claim 1, wherein, to transmit the beacon frame or the beacon extension frame according to the transmission time, the processing system is configured to cause the wireless device to:
   transmit the first MIC parameter via an information element of the beacon frame or of the beacon extension frame, wherein the TSF value indicates an actual transmission time of the beacon frame or of the beacon extension frame, and wherein the first MIC parameter is included in a corresponding one of the beacon frame or the beacon extension frame.

7. The wireless device of claim 1, wherein the processing system is further configured to cause the wireless device to:
   transmit an indication of a security scheme associated with the first MIC parameter, wherein transmitting the beacon frame or the beacon extension frame including the first MIC parameter is in accordance with the security scheme.

8. A wireless device, comprising:
a processing system that includes processor circuitry and memory circuitry that stores code, the processing system configured to cause the wireless device to:
   receive a beacon frame or a beacon extension frame according to a transmission time, the beacon frame or the beacon extension frame including a first message integrity check (MIC) parameter generated using a timing synchronization function (TSF) value associated with the transmission time, and the beacon frame including a second MIC parameter associated with the beacon frame and different from the first MIC parameter; and
   perform a first security check in accordance with the first MIC parameter to authenticate the TSF value.

9. The wireless device of claim 8, wherein, to receive the beacon frame or the beacon extension frame according to the transmission time, the processing system is configured to cause the wireless device to:
   receive the first MIC parameter via the beacon extension frame including the first MIC parameter; and
   receive, via the beacon frame, the second MIC parameter.

10. The wireless device of claim 9, wherein the processing system is further configured to cause the wireless device to:
   perform a second security check of a third frame in accordance with a success of the first security check and in accordance with a threshold time difference between reception of the beacon extension frame and reception of the third frame.

11. The wireless device of claim 9, wherein a first periodicity of the beacon frame is different from a second periodicity of the beacon extension frame.

12. The wireless device of claim 9, wherein, to receive the beacon frame or the beacon extension frame according to the transmission time, the processing system is configured to cause the wireless device to:
   receive the first MIC parameter via an information element of the beacon frame.

13. The wireless device of claim 12, wherein:
   the TSF value indicates a target beacon transmission time associated with the beacon frame, and wherein:
   the transmission time is offset from the target beacon transmission time.

14. The wireless device of claim 8, wherein, to receive the beacon frame or the beacon extension frame according to the transmission time, the processing system is configured to cause the wireless device to:
   receive the first MIC parameter via an information element of the beacon frame or of the beacon extension frame, wherein the TSF value indicates an actual transmission time of the beacon frame or of the beacon extension frame, and wherein the first MIC parameter is included in a corresponding one of the beacon frame or the beacon extension frame.

15. The wireless device of claim 8, wherein the processing system is further configured to cause the wireless device to:
   receive an indication of a security scheme associated with the first MIC parameter, wherein receiving the beacon frame or the beacon extension frame including the first MIC parameter is in accordance with the security scheme.

16. A method for wireless communications at a wireless device, comprising:

receiving a beacon frame or a beacon extension frame according to a transmission time, the beacon frame or the beacon extension frame including a first message integrity check (MIC) parameter generated using a timing synchronization function (TSF) value associated with the transmission time, and the beacon frame including a second MIC parameter associated with the beacon frame and different from the first MIC parameter; and performing a first security check in accordance with the first MIC parameter to authenticate the TSF value.

\* \* \* \* \*